United States Patent [19]
Michl et al.

[11] Patent Number: 5,876,830
[45] Date of Patent: Mar. 2, 1999

[54] METHOD OF ASSEMBLY OF MOLECULAR-SIZED NETS AND SCAFFOLDING

[75] Inventors: Josef Michl, Boulder; Thomas F. Magnera, Louisville; Donald E. David; Robin M. Harrison, both of Boulder, all of Colo.

[73] Assignee: Board of Regents of The University of Colorado, Boulder, Colo.

[21] Appl. No.: 711,448

[22] Filed: Sep. 6, 1996

Related U.S. Application Data

[60] Provisional application No. 60/003,405, Sep. 8, 1995.
[51] Int. Cl.$^6$ ........................................... B32B 5/12
[52] U.S. Cl. .................. 428/114; 156/60; 156/64; 435/6; 435/56
[58] Field of Search ................ 428/114, 40.1; 435/6; 436/56; 156/64, 60

[56] References Cited

U.S. PATENT DOCUMENTS

| | | | |
|---|---|---|---|
| 4,632,800 | 12/1986 | Barruad et al. | 264/298 |
| 4,997,676 | 3/1991 | Lafebvre | 427/245 |
| 5,402,550 | 4/1995 | Michl et al. | 252/299.01 |
| 5,468,851 | 11/1995 | Seeman | 536/22.1 |
| 5,532,129 | 7/1996 | Heller | 435/6 |

FOREIGN PATENT DOCUMENTS 64-14290  1/1989  Japan .

OTHER PUBLICATIONS

Michl, J. (1995), "The 'Molecular Tinkertoy' Approach to Materials," In Proc. of the NATO ARW Meeting: Applications of Organometallic Chemistry in Preparation and Processing of Advanced Materials, Cap d'Agde, France, Sep. 1994, J. Harrod, ed., Kluwer, Dordretcht, Netherlands.

Primary Examiner—Nasser Ahmad
Attorney, Agent, or Firm—Greenlee, Winner & Sullivan, P.C.

[57] ABSTRACT

The present invention relates to methods and starting materials for forming molecular-sized grids or nets, or other structures based on such grids and nets, by creating molecular links between elementary molecular modules constrained to move in only two directions on an interface or surface by adhesion or bonding to that interface or surface. In the methods of this invention, monomers are employed as the building blocks of grids and more complex structures. Monomers are introduced onto and allowed to adhere or bond to an interface. The connector groups of adjacent adhered monomers are then polymerized with each other to form a regular grid in two dimensions above the interface. Modules that are not bound or adhered to the interface are removed prior to reaction of the connector groups to avoid undesired three-dimensional cross-linking and the formation of non-grid structures. Grids formed by the methods of this invention are useful in a variety of applications, including among others, for separations technology, as masks for forming regular surface structures (i.e., metal deposition) and as templates for three-dimensional molecular-sized structures.

16 Claims, 8 Drawing Sheets

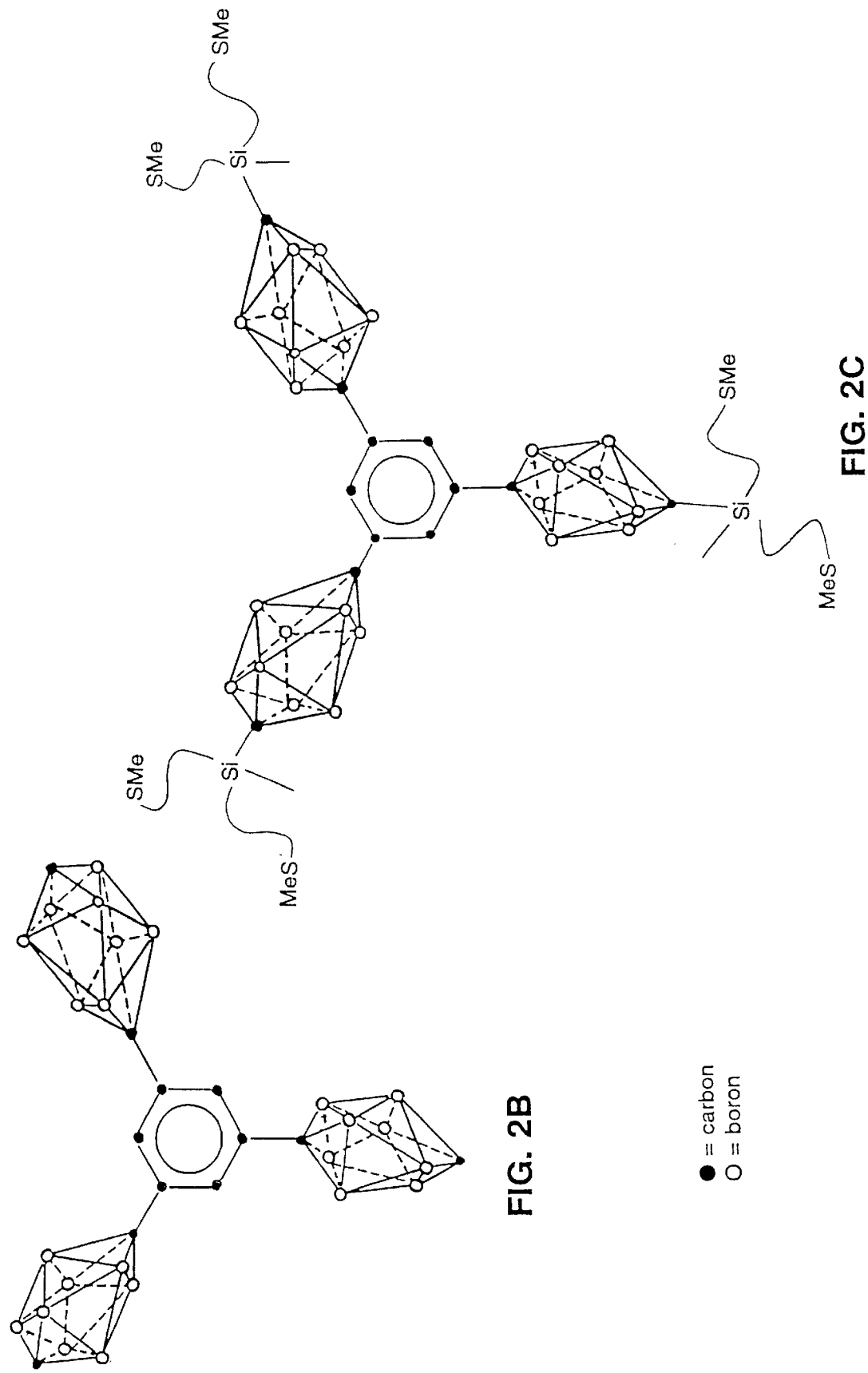

where

METHOD OF ASSEMBLY OF MOLECULAR-SIZED NETS AND SCAFFOLDING

This invention was made with Government support under contract number DE-FG03-94ER12141 awarded by the Department of Energy. The Government has certain rights in this invention.

This invention was made, at least in part, through funding from the United States government. The United States government has certain rights in this invention.

CROSS-REFERENCE TO RELATED APPLICATIONS

This application takes priority under 35 U.S.C. § 119(e) from U.S. provisional application serial No. 60/003,405, filed Sep. 8, 1995. This provisional application is incorporated by reference in its entirety herein.

FIELD OF THE INVENTION

This invention is in the general fields of modular chemistry and nanotechnology and more specifically relates to methods and materials for construction of molecular-sized structures.

BACKGROUND OF THE INVENTION

The general field of nanotechnology has long been a subject of speculation (Drexler, K. E. *Nanosystems. Molecular Machinery, Manufacturing, and Computation;* John Wiley & Sons, Inc.: New York, 1992) and much progress in the experimental design of two-and three-dimensionally networked three-dimensional crystal structures and supramolecular architecture has been reported. (Wang, X., Simard, M., Wuest, J. D., *J. Am. Chem. Soc.* 1994, 116, 12119; Wu, Z., Lee, S., Zhang, J., Pesak, D. J., Ludwick, J. L., Moore, J. S., *J. Am. Chem. Soc.* 1994, 116, 4227; Chen, J., Seeman, N. *Nature* 1991, 350, 631; Abrahams, B. F., Hoskins, B. F., Michail, D. M., Robson, R., *Nature* 1994, 369, 727; Fagan, P. J., Ward, M. D., Calabrese, J. C., *J. Am. Chem. Soc.* 1989, 111, 1698; Stein, A., Keller, S. W., Mallouk, T. E., *Science* 1993, 259, 1558; Yaghi, O. M., Li, H., *J. Am. Chem. Soc.* 1995, 117, 10401; MacGillivray, L. R., Subramanian, S., Zaworotko, M. J., *J. Chem. Soc. Chem. Commun.* 1994, 1325; Gardner, G. B., Venkataraman, D., Moore, J. S., Lee, S., *Nature* 1995, 374, 792; Bein, T.,Ed. *Supramolecular Architecture: Synthetic Control in Thin Films and Solids,* American Chemical Society: Washington, D.C., 1992; Michl, J., Ed. *Modular Chemistry,* Kluwer: Dordrecht, The Netherlands, in press; Kohnke, F. H., Mathias, J. P., Stoddart, J. F., *Angew. Chem., Int. Ed. Engl.* 1989, 28, 1103; Lehn, J.-M. *Angew. Chem., Tnt. Ed. Engl.* 1990, 29, 1304; Lehn, J.-M. *Supramolecular Chemistry,* VCH Publishers: Weinheim, 1995.) However, crystal engineering and self-assembly by weak interactions are only indirectly related to the methods of the present invention.

The ultimate goal of the methods of this invention is the construction or fabrication of molecular-sized structures (e.g., nets, grids or the like) by controlled combination of elementary modules (e.g., monomers) to form large structurally-defined molecules (e.g., polymers). The modules and methods employed for construction of such structures are reminiscent of children's "TINKERTOY" (Trademark, Playskool, Inc., Pawtucket, R.I.) construction kits. The elementary modules used in the methods of this invention preferably comprise molecular rods and connectors. The general use of such molecular elements for molecular construction has been described in the review article: J. Michl 1995 "The 'Molecular Tinkertoy' Approach to Materials" in *Proceedings of the NATO ARW Meeting: Applications of Organometallic Chemistry in Preparation and Processing of Advanced Materials* Cap d'Agde, France, Sepptember 1994 (J. Harrod, ed.) Kluwer, Dordrecht, Netherlands, which is incorporated in its entirety by reference herein. U.S. Pat. No. 5,405,550 (J. Michl et al.), which is also incorporated by reference in its entirety herein, gives a general description of the molecular "Tinkertoy" construction system, various molecular structures that can be made using the system, exemplary connector and rod components of such systems, exemplary chemistry of coupling rods to connectors and specific examples of the use of [1.1.1] propellanes as rod components.

SUMMARY OF THE INVENTION

The present invention relates to methods and starting materials for forming molecular-sized grids or nets, or other structures based on such grids and nets, by creating molecular links between elementary molecular modules constrained to move in only two directions on an interface or surface by adhesion or bonding to that interface or surface.

The component modules employed in the methods of the present invention comprise at least one connector to which linker arms, preferably linear rod-like groups end-functionalized for coupling, can be attached. The component modules are functionalized with groups that adhere to the interface. Yet when the module is bound to the interface, there is substantially free translation and rotation of the module on the interface. These adherent groups are herein called "tentacles". Within the module, connectors are distal to the site(s) of adherence of tentacles, and the tentacles are positioned on the module, such that the connector and any linker arms are spaced above the interface, do not bond to and preferably do not interact with the interface.

In the methods of this invention, molecular modules are employed as the building blocks of grids and more complex structures. Modules are introduced onto and allowed to adhere or bond to an interface. The connector groups of adjacent adhered modules are then reacted with each other to couple the modules and ultimately form a substantially regular grid in two dimensions above the interface. Connectors of adjacent modules with linking arms may be coupled to each other through those arms by use of a coupling reagent or coupling group. Linker arms can be reacted directly with linker arms of other modules or can be indirectly linked to such arms through an intermediate coupling group. Alternatively, connectors of adjacent monomers may be coupled to each other through a coupling group that comprises a linking arm or rod. Modules that are not bound or adhered to the interface are removed prior to reaction of the connector groups to avoid undesired three-dimensional cross-linking and the formation of non-grid structures. The size and shape of the openings in the grid formed depend generally on the type of connector, the orientation of linker groups around the connector, the number of linker groups in the modules, the length of the linking groups and the presence of any coupling groups.

Formation of the grid optionally includes annealing steps in which, for example, any defects in the regularity of the grid are minimized or corrected by employing, for example, reversible connector group coupling reactions in which defective couplings can be reversed to allow correct grid linking to occur. Connector group coupling reactions are preferably reversible under the conditions of the coupling reaction and irreversible under the conditions in which the grid structure will later be employed. Grid defects or holes can also be corrected by molecular "stitching" employing appropriately sized functionalized molecules which can react across and close such holes.

After the first grid structure is formed, it can be released or removed from the interface, for example, by removing or chemically modifying the tentacles holding the grid to the interface. The resulting single-ply grid can then be transferred to another surface appropriate for its application using, for example, well-known techniques for manipulating Langmuir/Blodgett films. Alternatively, two-ply grids can be formed, if modules are provided with a second connector group spaced apart from the first connector group in the module. This second connector may also have linker arms. After formation of the first grid by coupling of adjacent modules through the first connector, the second connector of adjacent modules, which are held oriented for grid formation by the first grid, can then be reacted to form a second grid resulting in a two-ply grid. The coupling of the second connectors can, for example, be accomplished by activating them for coupling only after the first grid level has been formed to avoid cross-linking between connector levels. For example, activating linking groups on a second connector can be provided by cleavage or chemical modification of tentacle groups. Modules can, in principle, be provided with a third (or higher) connector with optional linker groups, spaced apart from other connectors in the modules, and which can be reacted with each other to form a third (or higher) level grid. The formation of more than two grid layers employing the modular chemistry of this invention, is however, not generally preferred. Grids formed by the method of this invention can, however, be employed as templates for epitaxial extension to form multi-layer grid structures.

In specific embodiments, modules are monomers, and the preferred grid formed is a polymer in which the links among monomers form the structure of the grid. Monomers comprise a connector with optional linker arms, preferably those arms contain rods or rod-like portions, and monomers are functionalized with tentacle groups that adhere to a selected interface. Specific monomers include those comprising a molecular pillar structure carrying at one end a first connector with optional linking arms and which has at its other end a pedestal group linked to the interface-adherent tentacles. The first connector and any linking arms it carries are thus confined to a thin segment of space above the interface, and separated from the interface by about the height of the pillar, by adherence of the monomer to the interface. A connector provides a plurality of sites for binding to connectors of other monomers. Each connector will be coupled to a plurality of connectors of other monomers to form the grid. The relative orientation of the links from one connector (or its arms) to other connectors is determined by the positioning of bonding sites of the connector.

Linking of the oriented connector or their linker arms (e.g., linker rods) to other monomers generates a two-dimensional molecular grid or net generally parallel to the interface or surface, rather than a three-dimensional network structure. The net pattern (i.e., shape of openings in the next) and the sizes of the openings in the net are dictated by the choice of connectors, linker arms and coupling groups. Two-ply grids can be constructed by initial formation of a first grid by couplings among first connectors, followed by release of the grid from the interface, after which a second grid is formed by couplings among the second connectors.

In more specific embodiments, the pedestal group of a monomer comprises a second connector group which carries the tentacle groups. In such monomer, cleavage or chemical reaction of the tentacles releases the first grid and either activates the second connectors for coupling or activates or generates linker arms for coupling to form the second grid.

Connector bonding sites for coupling to other connectors or to linker arms, are preferably regularly spaced around the connector at fixed angles. Most preferably, there are either: three sites which will form bonds that are oriented at about 120° to each other, four sites that will form bonds that are oriented at about 90° to each other, or six sites that will form bonds that are oriented at about 60° to each other. Preferably the bonding sites of a connector will allow formation of bonds (to linker arms, coupling groups or other connectors) around the connector oriented in a plane substantially parallel to the interface to which the monomers are adhered before coupling.

Interfaces employed in this invention are intended to provide a substantially molecularly flat surface upon which modules (e.g., monomers) can be confined to move in two-dimensions and which facilitate formation of a regular grid when connector groups are reacted. Useful interfaces include liquid/solid, gas/solid, liquid/liquid (i.e., immiscible liquids), including solvent/solvent interfaces (e.g., hexane-water or toluene-water), a solvent phase (including aqueous phases)interface with a liquid metal (e.g., liquid mercury metal) or a metal (e.g., Au, Cu) surface (a solid metal surface or a metal surface supported on an inert substrate, e.g., Au sputtered onto a glass substrate).) Flat metal surfaces including gold surfaces can be prepared by sputtering gold on a treated glass substrate until the substrate is opaque. The glass substrate can be sputter-etched with argon ions prior to sputtering of metal.

Again in specific embodiments, the monomers useful in the methods of this invention comprise connectors which are either point connectors providing a plurality of oriented sites for binding rod-like coupling groups to form links to connectors of other monomers or star connectors with a plurality of oriented linker arms which can be coupled directed or indirectly via coupling groups to linker arms of other connectors. These monomers also contain a pedestal group carrying a plurality of tentacle groups having affinity for bonding to a selected interface. In these specific monomers, the point or star connector is mounted via a chemical bond (the pillar) on a molecular pedestal group such that the connector is held above the interface to which the monomer is bound. Adherence of the monomers to the interface confines them to move in two dimensions on the interface. The adhered monomers are then coupled through point or star connectors in a two-dimensional cross-linking polymerization to form a substantially regular grid of molecular couplings of linker arms or coupling groups above the interface.

This invention provides methods for construction of trigonal, hexagonal and tetragonal, single and multi-layer grids or nets from the hexagonal, trigonal and square planar monomer precursors, respectively, for such structures. The nets and grids made by this invention are ultrathin polymers useful, among other applications, for separations and as starting material for layer-by-layer synthesis of well-controlled and regular, but aperiodic, multi-layered molecular structures. Single or two-ply grids made my the methods of this invention can serve as templates for epitaxial extension by covalent construction of additional grid layers. Optionally, grids are constructed to permit subsequent attachment or generation of chemical functionalities at connectors, on linker arms, and/or on coupling groups, either directly or via an intermediate tether group. This subsequent functionalization of the grid can be employed to modify the chemical nature of the grid surface or to provide sites for attachment of monomers in the construction of additional grid layers. Additional physical properties, including conductivity and increased mechanical strength, can be achieved with the molecular grids and nets of this invention by filling or coating the structures with polymerizable material followed by curing or by electrodeposition of a metal or a semiconductor on the structures. Grids of this invention can be employed as masks or templates for formation of surface structures, e.g., for surface deposition of patterns of metal or semiconductors. Grids can, for example, be used in the preparation of a selected pattern or regular array of quantum dots deposited on the interface through the openings in the grid.

BRIEF DESCRIPTION OF THE FIGURES

FIGS. 2(a)–2(d) schematically illustrate the method of this invention for synthesizing a molecular hexagonal grid. FIG. 2(a) illustrates monomers oriented and optimally spaced on an interface or metal surface. FIG. 2(b) illustrates polymerization of the linking rods of the monomers to give a regular hexagonal array. FIG. 2(c) illustrates polymerization of the pedestal linker rods after removal of tentacle groups. FIG. 2(d) provides an exemplary trigonal monomer with two trigonally substituted phenyl ring connectors having 12-vertex p-carborane rods (or arms), one of which is derivatized with thioether tentacles, connected to each other via a diruthenium complex pillar.

DETAILED DESCRIPTION OF THE INVENTION

Figure 1:
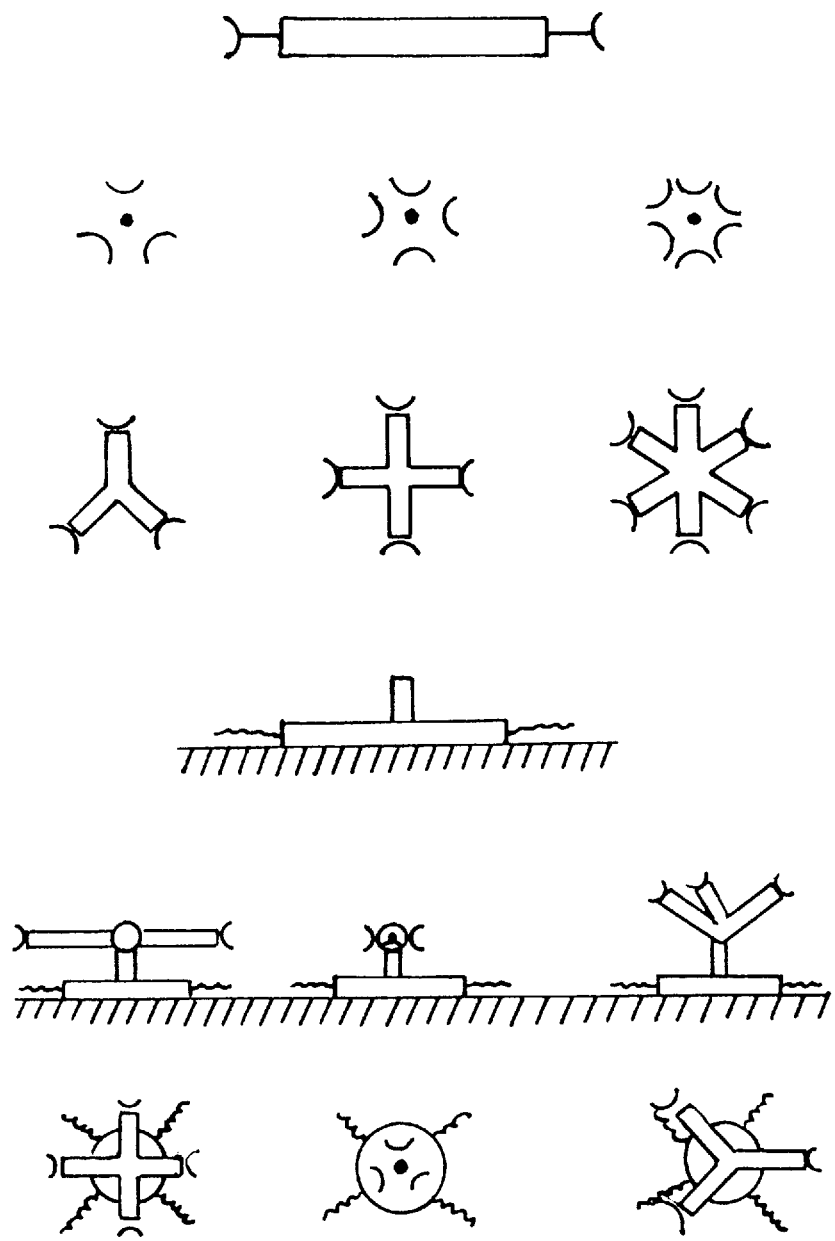
FIG. 1 illustrates structural and functional aspects of the components of the molecular modules and monomers of this invention employed for construction of molecular grids and other structures.

The grid or net structures of this invention are formed by polymerization of molecular modules, e.g., monomers, confined by binding at an interface, to form a substantially regular polymeric two-dimensional structure. The monomers are bound at an interface surface by molecular groups, preferably flexible groups, herein called tentacles, comprising one or more groups with affinity for binding or adhering to an interface surface. Monomers are constrained to the interface by binding of the tentacles, can not leave it or turn over. However, monomers are substantially free to translate and rotate in two-dimensions at that interface. Monomers also have a connector distal to the tentacles with a plurality of sites for coupling to other monomers. These sites may have linking arms which can be coupled employing a coupling agent to linking arms of other monomers. Alternatively, a connector can be coupled to a connector of another monomer via a coupling group, that can contain a linking arm. Binding of the monomer at the interface substantially orients it with respect to the interface such that the connector with its sites for linking arms are above and do not bind to the surface. The sites for linker arms are oriented with respect to each other at selected angles by a connector group. Preferred connectors have sites for linking arms or have linking arms oriented at fixed regular angles of about 60°, 90°, or 120°. The interface-confined and oriented monomers are polymerized with adjacent interface-confined monomers through reaction of connectors or their linking groups to generate a substantially regular polymeric two-dimensional grid or net. The term polymerized as used herein refers generally to the process of linking modules into a two-dimensional grid by formation of any kind of bond between linking groups of adjacent modules. Preferred bonds are those that are not readily broken under the conditions in which the grid will be used. Polymerization of oriented connector/linker group components forms a regular patterned two-dimensional structure. The bonds forming the structure can most generally be hydrogen, ionic, dative or covalent bonds, for example. Hydrogen bonds are useful in forming initial grid structures for possible later replacement with more sturdy bonds and are also useful in grids that are intended to remain on the interface on which they were formed.

Defects in the grid can be minimized or repaired in several ways. Most simply, defects are minimized using "thermodynamic control", i.e., using coupling reactions that are reversible under the reaction conditions and yet which produce links that are strong under the conditions of intended use. Under reversible coupling conditions, initially formed defects can be annealed, with defective couplings replaced with desired couplings that form the regular gird. Reversible coupling conditions can be applied to the entire grid or to selected portions of the grid to correct defects. For example, a process like zone refining can apply reversible reaction conditions repetitively across the grid, for example, by passing a trough of selected reagents repetitively across the initially polymerized grid. Such annealing can, for example, produce larger two-dimensional grids from smaller grid domains that might be formed initially on the interface.

The reversibility of coupling during grid formation that is preferred and the ultimate preferred irreversibility of coupling in the final grid may be achieved by conversion of initially formed reversible grid links to links that are substantially irreversible to form a grid that is sturdy under conditions of practical interest. A reversible link, e.g., coupling group, is replaced with an irreversible link of similar size (i.e., length) and orientation. By selection and control of appropriate conditions (temperature, solvent, etc,), replacement occurs gradually over the grid so that the initially formed grid structure is not significantly disturbed. For example, reversible grid links or couplings between connectors, such as those based on hydrogen bonds, can be replaced by stronger, less reversible linkages.

For example, the coupling agent (a rod-like coupling agent):

where R, independently, are H, alkyl or aryl groups, can be employed to form reversible linkages between amines, particularly pyridines, as used in porphyrin monomers and other monomers described herein. This reversible linkage can be replaced with the comparably sized irreversible coupling agent, p-xylene dibromide.

Grid coupling agents include those that link two connector arms from different monomers, for example in a linear fashion such as a metal, Hg. Coupling groups may, however link three linker arms (e.g., a trigonal site), four linker arms (e.g., a tetrahedral site such as amines linked to $NiCl_2$), or a greater number of linker arms (uranyl moieties can, for example, couple six linker arms). More complex coupling arrangements can also be used. For example, amine functionalized rods can be coupled via boron halide coupling groups through the formation of a borazine ring:

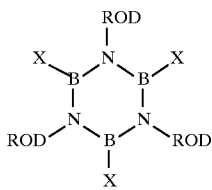

where X is a halide and ROD represents a rod connection to a monomer. In the borazine ring, three rods of different monomers are linked together. Amine functionalized rods can be reacted with $BCl_3$, for example, to achieve this coupling. An analogous coupling forming borazine linkages in which RODs are linker to the borons of the borazine would occur if connector rods were functionalized with a $BX_2$ moiety (e.g., —$BCl_2$) and reacted with ammonia or amines.

Tentacles are selected to achieve desired adherence to a selected interface. The type of tentacle needed depends on the type of interface or surface that will be used. For a liquid Hg surface, tentacles having thioether, isothiocyanate, thiol, thioacid, dithioacid, selenium, and 1,3,5-trisubstituted benzene functionalities should have appropriate affinity for grid construction. It may be necessary, to control the surface potential in order to maintain adherence of groups to metal surfaces during polymerization. This is believed to be important in the use of thioether tentacles on liquid mercury.

Local defects, i.e., holes or tears, in the grid can be corrected by use of appropriately sized multi-functional molecules that can react at sites on the grid across the defect and function to close it.

Once polymerization of the desired grid occurs, the tentacles can be removed or chemically modified to release the grid from the interface. The grid will then have no special affinity for the interface and can be manipulated, e.g., by a Langmuir-Blodgett-type transfer.

Monomers can be provided with a second connector with optional linker groups to allow formation of a second polymerized grid, after formation of the first grid, to generate a two-ply grid. For example, linker groups on a second connector can be activated by removal or chemical modification of the tentacles after formation of the first grid. If necessary, defects in the second grid can be corrected by annealing or "stitching" processes.

When the ultimate goal of the molecular construction is a multi-layer grid, monomer groups can be provided with additional sites for attachment (after initial grid formation), for example extending above the level of the first grid, i.e., upward from the first connector. Axial binding sites on a connector which extend above (or below) the level of the laterally formed grid could be employed to attach an additional layer of monomers. (An additional layer could analogously be bound through any second connector in the monomer.) Monomers would then be bonded to a synthesized grid layer, directly through linked connectors or via coupling groups which link the connectors. Alternatively, sites for binding additional layers of monomer could be provided on linker arms or via a choice of coupling agents which have axial sites for binding above (or below) the initially formed grid(s). The distance between grids layers can be selectively adjusted by choice of linker arm or coupling agent. The multi-layer grids could, for example, be constructed with different spacings between layers, if so desired.

More specifically, a monomer (IA–D) can comprise three portions: a pedestal portion (PED) comprising a connector group $C_P$ with tentacles T that have an affinity for an interface (e.g., adhere to an interface), the linking connector portion CON with a connector $C_L$ and optional linking groups, e.g., linking rods $R_L$, and a pillar PIL bonding CON and PED, so that the CON portion is held above the interface by the PED portion. The pedestal has a connector $C_P$ group attached directly or indirectly to a plurality of tentacle groups, T, carrying X groups which have affinity for adhering or binding to a selected interface. Provision can be made for removal of tentacles after polymerization of the net. X groups are optionally attached to $C_P$ via rod-like portions $R_P$, which are capable of, or can be activated for, linking to $R_P$ of other monomers to generate a second-layer polymerized grid.

$$\begin{array}{ll} \text{CON} & \text{IA} \\ | & \\ \text{PIL} & \\ | & \\ \text{PED} & \end{array}$$

$$\begin{array}{ll} C_L & \text{IB} \\ | & \\ \text{PIL} & \\ | & \\ C_P(T)_n & \end{array}$$

$$\begin{array}{ll} C_L(R_L)_m & \text{IC} \\ | & \\ \text{PIL} & \\ | & \\ C_P(T)_n & \end{array}$$

$$\begin{array}{ll} C_L(R_L)_m & \text{ID} \\ | & \\ M & \\ | & \\ C_P(R_PX)_n & \end{array}$$

In formulas IB–ID n and m are integers that indicate the number of tentacles or linker arms in a given monomer. The number of tentacles must be sufficient to provide adherence to the selected interface: n can be one or more, is preferably 2 or more and more preferably is 3 or more. In general, if the pedestal group comprises a connector, all lateral binding site of the connector(i.e., those around the connector) preferably are linked to tentacle groups. More preferably n is 3 to 6. The X moieties of the tentacles are chosen to preferably have a high affinity for binding to an interface such that the monomer strongly adheres to the particular type of interface selected, but remains mobile on that surface. Tentacle binding to the surface must be substantially stable under the conditions of the polymerization reaction to form the first grid to avoid undesired three-dimensional cross-linking to free monomers. The presence of minor amounts of free monomers can, however, be tolerated. Any hole or grid defects that may occur as the result of such minor detachment of monomers can be repaired by annealing or "stiching" processes. The CON portion of the monomer can have a connector $C_L$ attached to a plurality of rod-like molecules $R_L$ (linker arms) the free end(s) of which can be polymerized to the free ends of $R_L$ of other monomers. The CON group has at least three linker rods to facilitate formation of a grid or net structure on polymerization of the monomers (m is an integer equal to three or more). Preferred m are 3, 4 and 6.

FIG. 1 illustrates components for construction of molecular grids by the methods of this invention. Axially functionalized rods (A) can function as linking or coupling groups between point or star connectors (B). Pedestals (C) with tentacles (wavy lines), optionally linked through a second connector, adhere to interface or surfaces. Connectors with linker groups are mounted on the pedestal, through a pillar linkage to form monomers (D). As illustrated in FIG. 1, linker arms can be oriented in a plane substantially parallel to the interface or each arm oriented at an angle to that plane, e.g., as would occur at a tetrahedral center. The trigonal monomer illustrated in FIG. 2 has three carborane rods for grid formation and three tentacle groups attached to carborane rods on its pedestal shown as wavy lines. The pillar of the illustrated monomer is a metallocycle moiety, -Ru-Cyclopentadiene-Ru-.

Figure 2A:
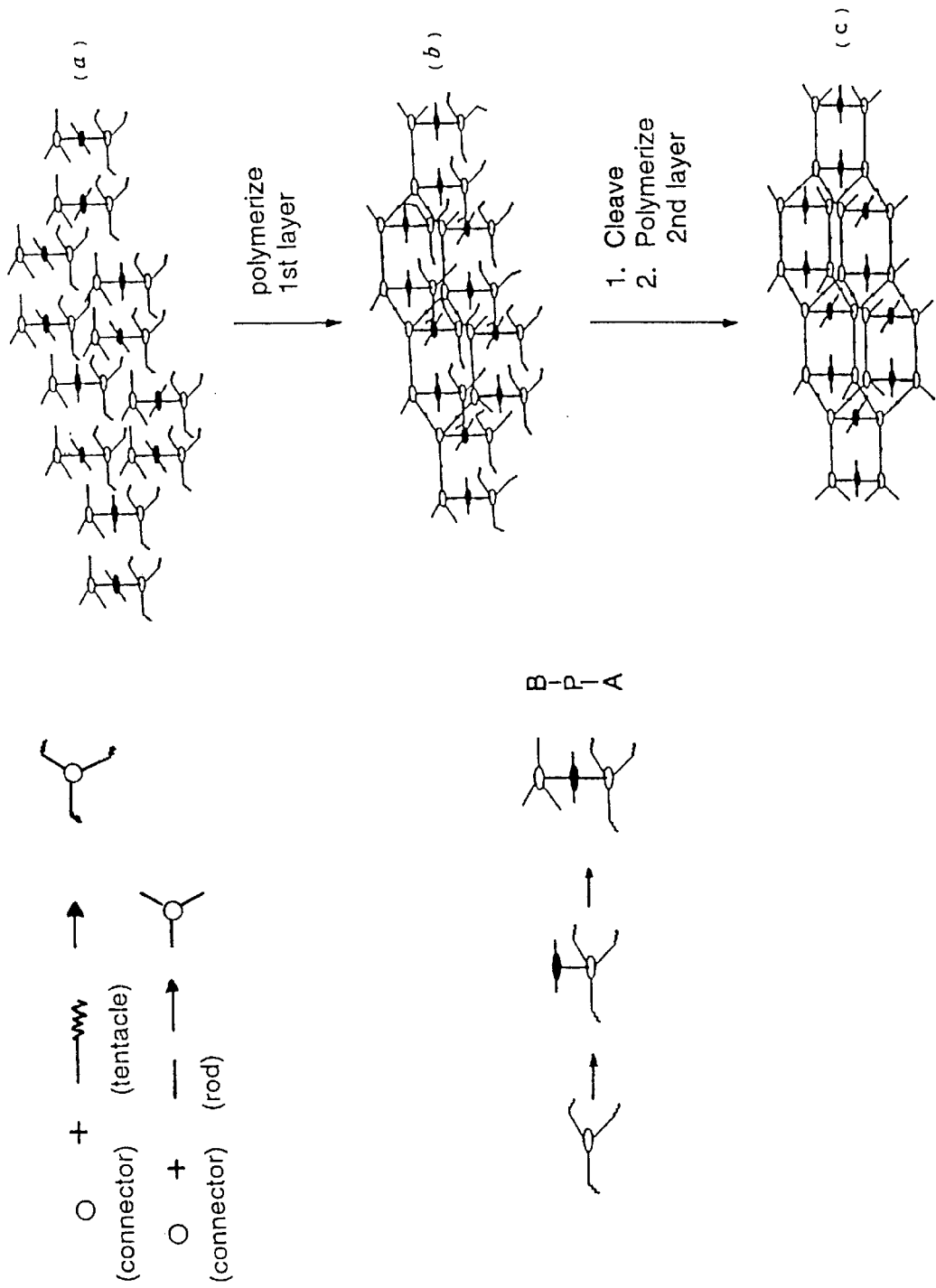
Figure 2D:
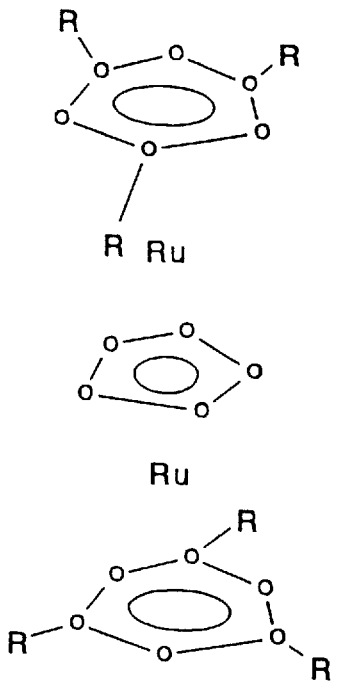
Figure 2D:
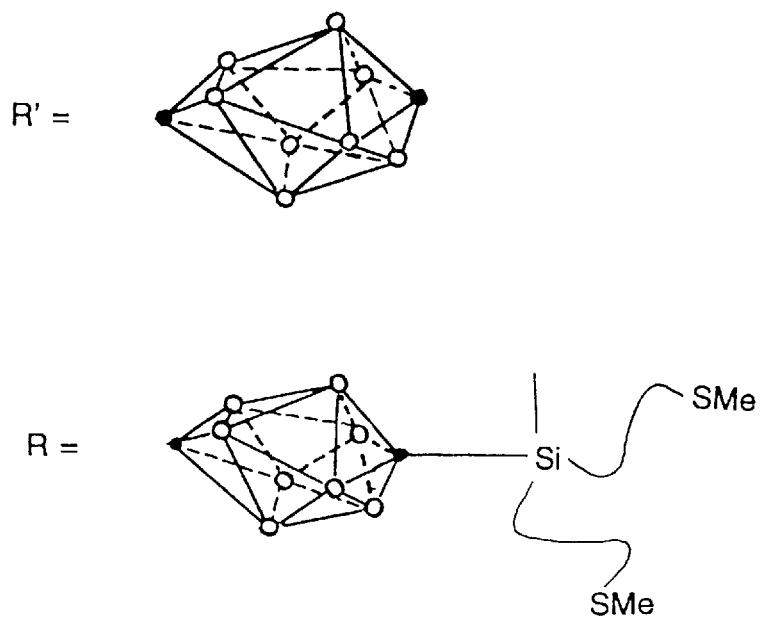

The method of this invention is schematically illustrated in FIG. 2 for a trigonal monomer, having three linking rods. The monomer illustrated in FIG. 2 has three linking arms bound to a pedestal (A) having three tentacles represented by wavy lines, a connector with oriented rods (B) and a pillar group (C) providing a substantially linear link, either covalent or ionic, between the connecting arms or rods (CON) and the pedestal.

Monomers are introduced and bound to an interface via their tentacles. The orientation of the monomers at the surface can be checked by surface spectroscopic methods, for example infrared spectroscopy of the monomer layer. The concentration of monomers, i.e., the surface density of monomers, confined and oriented at the interface is adjusted to facilitate polymerization into the desired regular layer pattern and minimize defects in the resultant polymerized layer grid. In the illustrated method, the surface density of monomers is adjusted so that on average, the linker rod ends are positioned at the optimal close separation for achieving the desired grid pattern through coupling reactions of linking rods. FIG. 2(a) shows close packing of trigonal monomers on an interface surface to achieve a regular hexagonal pattern in the polymerized layer. Most typically, monomers will be introduced to the interface in a solvent that can be ultimately evaporated. It may be necessary to control the timing of addition of monomers, the concentration of solutions of monomers, the solvent employed, or the temperature of the interface to achieve desired relative orientation of monomers for regular gird formation. Polymerization proceeds by joining the three free linker rod ends of one confined monomer to one free linker rod end of each of three other neighboring confined monomers to generate a first two-dimensional hexagonal grid as shown in FIG. 2(b). For example, polymerization can be accomplished by application of an activating agent (as a gas or in a solvent) to adhered monomers on the interface to activate functional end groups of the linking rods for polymerization and/or a coupling agent (illustrated by small closed circles in FIG. 2(b) and (c)). After the coupler attaches at the activated end of a rod, it is within bonding distance from an activated free rod end on a neighboring monomer to which it bonds to bridge the rod ends linearly to ultimately form the desired regular array structure. More simply, linker rod ends can carry functional groups capable of dimerizing with each other or capable of binding to or chelating with an added coupling agent, for example a metal cation or metal complex.

The surface density of monomers can be adjusted by changing the concentration of monomers at the interface or by controlling the surface area of the interface surface to which the monomers are adhered. Surface density can be adjusted empirically for a particular monomer and coupling chemistry to achieve a minimal defect grid. Alternatively, optimal surface density for a given monomer and linking chemistry can be estimated based on initial estimates of the size of a monomer on the surface and the optimal monomer spacing to obtain a given grid geometry (e.g., square, hexagonal, etc.). Surface densities based on such estimations can be readily optimized in practice to minimize pattern defects in the net.

Grids can be formed in a stepwise or sequential fashion across the interface by selected application of coupling or activating agents for polymerization to domains or zones of the interface. Grids then are extended by extending or moving the zone to which such agents are applied. Annealing or repair processes, as discussed above, can be applied to correct grid defects.

A variety of now-routine techniques used in surface analysis can be employed to assess the structure of polymerized grids, to detect defects in grids or nets, and monitor the addition of layers to form scaffolding. These techniques include among others, EELS, LEED, AUGER, IR, and UV-VIS spectroscopy, examining surface-induced second harmonic generation and grazing incidence X-ray studies on a synchrotron. In addition, grid structure can be visualized using scanning probe techniques including STM and AFM.

After polymerization is complete, i.e. substantially all of the linking arms of the monomers are coupled, any activated connector rod groups or coupling groups that remain free can be deactivated or capped. Alternatively, structural defects in the net that result from unlinked rod groups or irregular bonding can be stitched together by using flexible bridging molecules, such as α,ω-disubstituted alkane chains of varying lengths carrying spaced reactive groups to generate molecular bridges across the defect. Branched polyfunctional bridging molecules which can attach at more than two points on the grid can also be employed in defect removal.

Connectors are chemical moieties providing oriented sites for binding capable of attaching a plurality of linker rods. There are two classes of connectors: (1) those that form essentially irreversible attachments, like C—C bonds to rods and (2) those that form attachments that are readily reversible, such as ligand-to-metal bonds.

Figure 3:
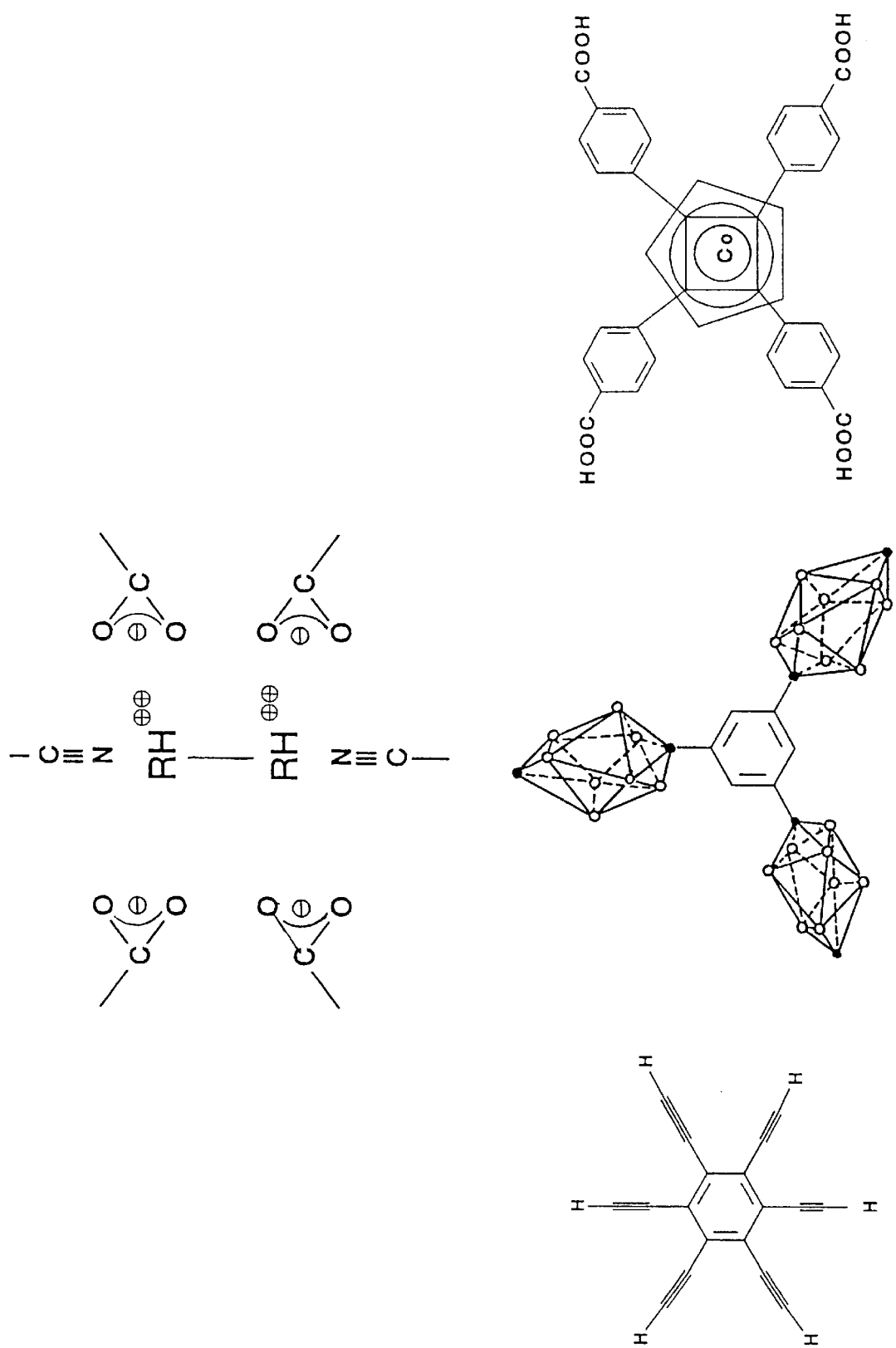
FIG. 3 illustrates exemplary connector groups useful in the methods of this invention.

There are two structural types of connectors: point connectors and star connectors. Point connectors attach linking rods at fixed angles by forming bonds that are geminal to each other. A wide variety of such point connectors is available including transition metal atoms or ions. For example, dirhodium tetracation is a point connector. Point connectors can attach rods in geometric arrangements including trigonal, square planar or tetrahedral geometries. On polymerization, bonds link connectors of adjacent monomers via coupling groups. Star connectors carry arms at fixed angles, and attach coupling groups, e.g., rods, at the arm ends or can directly attach an arm of another star connector. The connectivity of the connector is given by the number of bonding sites or linker arms (linker groups, including linker rods) that it carries. On polymerization bonds connect the arms of two star connectors either directly or through a coupling group. An example star connector is 1,3,5-tris(ethynylbenzene) (Hübel, W.; Merényi, R. (1962) *Angew. Chem.* 74:7810) whose three acidic terminal alkyne hydrogens are available for linear coupling directly to each other, or through transition metal atoms or related coupling groups. Several connectors are illustrated in FIG. 3.

Connectors suitable for use in the methods of this invention include among others trigonally substituted benzene derivatives, hexasubstituted benzene derivatives (e.g., hexaethynylbenzene), 1,3,5-(p-carboranyl)benzenes, tetrasubstituted cyclobutadienyl systems, trisubstituted cyclopropenyl systems or tetrasubstituted porphyrins.

Figure 4:
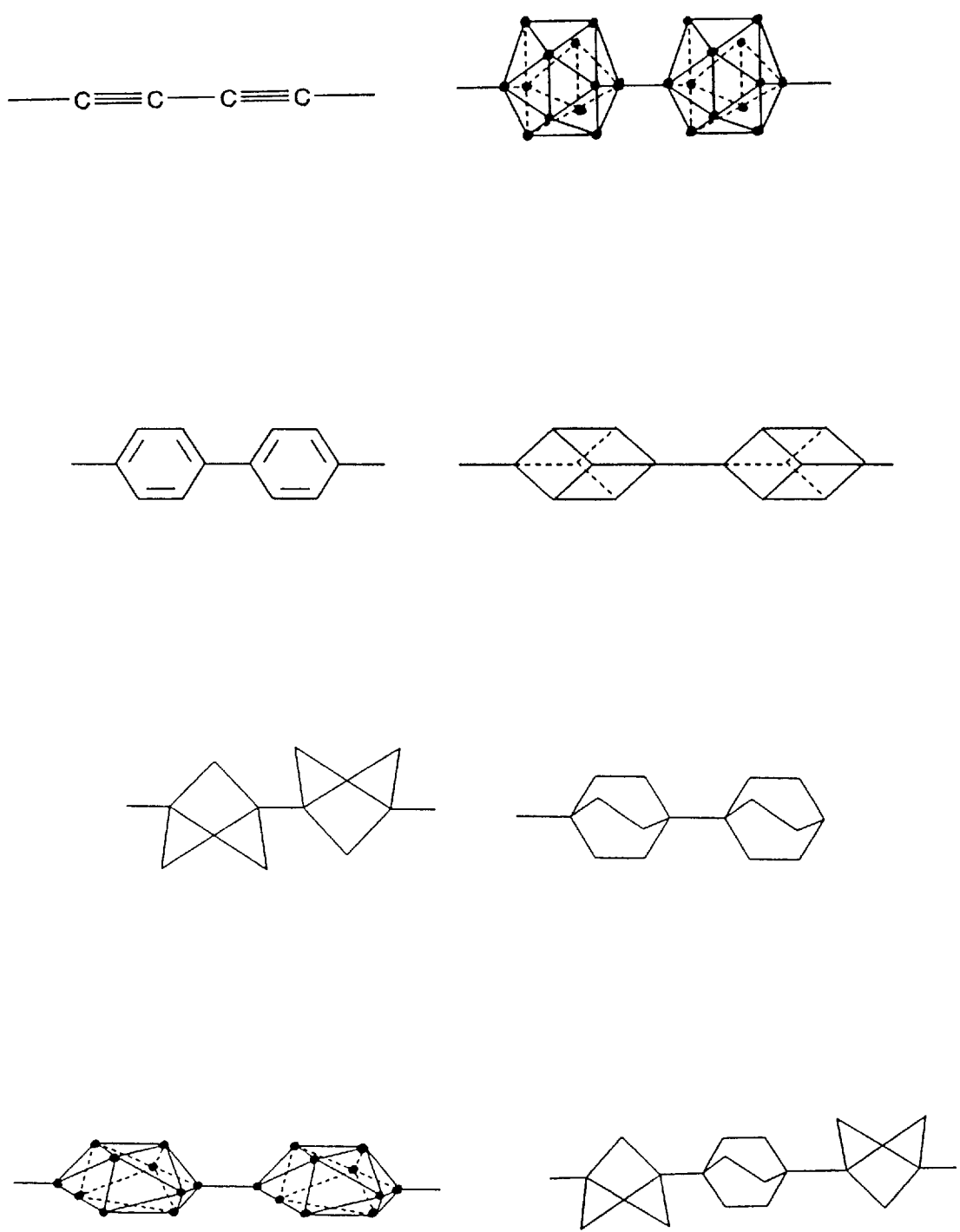
FIG. 4 illustrates exemplary rod-like groups that are useful as linker groups or coupling groups in components of the modules and monomers of this invention. Rod ends are typically activated with functional groups that allow bonding to connectors or to other linker groups.

A variety of rigid rod-like molecules can be employed to synthesize monomers suitable for polymerization by the methods of this invention as linking arms $R_L$ in the CON group (IA–D) or as possible $R_P$ (with appropriate functionality) in tentacle groups. Useful linking arms generally include, among others, alicyclic hydrocarbons and their oligomers; aromatic and heterocyclic aromatic groups including but not limited to para-substituted phenyl, biphenyl or polyphenyl groups, pyridyl, bipyridyls (D. B. Amabilino and J. F. Stoddart (1994) *Chem. Mater.* 6:1159 and references therein) or polypyridyls, carboranes and their oligomers and polyynes. FIG. 4 illustrates a number of rod-like species that can be employed in linker groups and coupling groups to form links between monomers in grids. Such rods are end functionalized to allow bonding between connectors. Variously combined, these structural units permit the rod length separating monomers to be selected to within the nearest Å unit or so. Component connectors and rods, such as those of FIG. 3 and 4, can be combined to form CON groups (as in IA) for modules and monomers useful in this invention.

More specifically, alicyclic rods include among others:

bicyclo[2.2.2]octanes, and their dimers, trimers and tetramers (H. E. Zimmerman et al. (1980) *J. Org. Chem.* 45: 3933; H. E. Zimmerman et al. (1992) *J. Org. Chem.* 57: 5484;

cubanes and polycubyls (P. E. Eaton and M. Maggini (1988) *J. Am. Chem. Soc.* 110:7230; R. Gilardi et al. (1988) *J. Am. Chem. Soc.* 110:7232; K. Hassenrück et al. (1990) *J. Am. Chem. Soc.* 112:873; P. E. Eaton and J. Tsanaktsidis (1990) *J. Am. Chem. Soc.* 112:876);

[1.1.1] propellanes and their oligomers ([n]staffanes) (P. Kaszynski and J. Michl (1988) *J. Am. Chem. Soc.* 110:5225; P. Kaszynski et al. (1988) *Mol. Cryst. Liq. Cryst. Lett.* 6:27; P. Kaszynski et al. (1990) *Mol. Cryst. Liq. Cryst.* 191:193; P. Kaszynski and J. Michl (1994) *Advances in Strain in Organic Chemistry,* JAI Press, Inc. Greenwich, Conn.);

mixed oligomers, e.g. cubane-[1.1.1]propellane oligomers, bicyclo[2.2.2]octane-[1.1.1]propellane oligomers and carborane.-[1.1.1] propellane oligomers, among others, see Hassenrück et al. (1990) *J.Org.Chem.* 55:1013.

alicyclic/aromatic ring combinations, e.g., [1.1.1] propellane-para-substituted phenyl and carborane-para-substituted phenyl combination, among others.

In general, useful rods can be prepared by combinations of any of the listed monomeric rods.

Bridge methylenes in alicyclic rods can be substituted, for example, with halogens or other substituent that do not interfere with rod linking or coupling chemistry. For example, perfluorinated [n]staffanes (J. Michl (1995) supra) can be used in linking rods.

Carboranes useful as rods include 6-vertex (see Grimes, R. N. "Carboranes" (1970) Academic Press, New York and London, p.32; Hosmane, N. S. et al. *Inorg.Chem.* (1990) 29:2698), 10-vertex and 12-vertex p-carboranes and their oligomers:

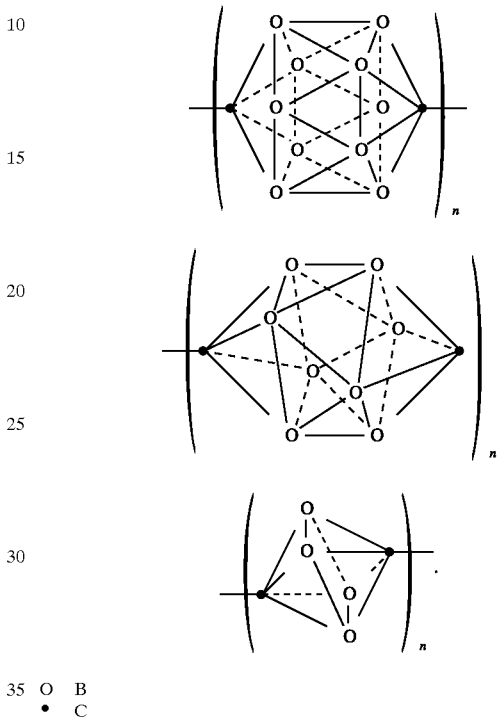

O B
• C

Monomer, dimer and oligomers of such carboranes have been described by Müller et al. (1992) *J. Am. Chem. Soc.* 114:9721 and X. Yang et al. (1992) *J. Am. Chem. Soc.* 114:9719. The synthesis of exemplary monomers having carborane linking arm or rods is provided in Example 2 herein. The methods provided herein for attachment of 12-vertex carboranes to connectors and the polymerization of these carborane linker arms can be readily adapted to synthesis of monomers with other carboranes and their oligomers.

In the synthesis of grids or nets of this invention, preferred alicyclic and carborane rods are monomers, dimers, trimers and tetramers. Preferred aromatic rods are para-substituted phenyls or biphenyls.

Pedestal groups of the monomers of this invention are constructed by attaching tentacles with affinity for a chosen interface or surface to a connector group, such as those described above. Tentacles can be attached, for example, directly to a point connector or to the ends of rod-like arms of star connectors. The tentacle groups attach firmly to a chosen interface or surface and can be flexible chains or more rigid moieties. Flexible chains carrying groups with high affinity for a chosen interface are preferred. The tentacle group is selected to balance strong affinity for the surface and chemical inertness under conditions of the polymerization reaction. The chemical nature of the tentacle group and the number of such groups on the pedestal can be adjusted to achieve high affinity for a chosen interface or surface. That affinity should provide sufficient adherence or bonding with the chosen interface to confine monomers to the surface for polymerization. Further, the tentacle should ultimately be removable from the monomer to allow release of the polymerized net or grid. (Alternatively, destruction of the interface or surface itself can also be employed to release polymerized net or grid.) After tentacles are cleaved and polymerized, nets are released from the interface or surface, and the net can be transferred to a metal mesh or thin polymer sheet using techniques now used for Langmuir-Blodgett films.

Interfaces, such as the interface of immiscible liquids, e.g., an aqueous-organic solvent interface, or a metal surface, such as a clean solid metal surface or a liquid mercury or mercury amalgam surface, are used in the methods of this invention to orient monomers for polymerization into regular grids. Aqueous solutions used in such interfaces include electrolytes and non-electrolytes.

At present, liquid mercury or mercury amalgam surfaces are preferred. Other clean metal surfaces (e.g, Au and Cu) and other liquid metal surfaces (at elevated temperatures) can be employed. The metal surfaces used are preferably clean metal surfaces without oxide or other coatings. Metals that are not easily oxidized are preferred. Fe and Al surfaces are less preferred, since they can rapidly oxidize unless high vacuum technology is employed. Monomers are introduced to a metal surface in an appropriate solvent under inert atmosphere, if needed to minimize oxidation at the metal surface. Tentacles having strong affinity for mercury or gold surfaces include carboxylic acid groups, thioethers and halides.

It may be desirably to control the surface potential when metal surfaces are employed as interfaces. Surface potential control can be accomplished by methods well known in the electrochemical art by use of an electrolyte solvent and application of an appropriate potential between the metal and solvent. Controlling the surface potential can enhance or stabilize adherence or binding of tentacles or minimize undesired reactions of tentacle groups.

Mercury (or mercury amalgam) is also preferred as an interface since its atomically flat surface is disturbed only by thermal motion and provides excellent conditions for the polymerization reaction. The use of mercury droplets provides access to spheroidal thin film nets. The nets of this invention are so thin that they are quite pliable and can be given any desired shape by deposition over a suitably shaped form.

Net or grid synthesis can also be done at a water/organic solvent interface (or other immiscible liquid interface), e.g. a water/hexane or pentane or a water/xylene interface. In this case, tentacles are either made hydrophobic to bind to the organic phase or hydrophilic to bind to the water phase. The linking connector and rods then must have the opposite character: hydrophilic if the tentacles are hydrophobic and hydrophobic if the tentacles are hydrophilic.

Pillars include any chemical moieties that can form a link between the linker connector and the pedestal and separated the linker connector from the interface. The pillar may be a linear, axial structure or have a branched or other structure. Metal ions, metal complexes, including mixed metal sandwich complexes can be employed as pillars.

The polymerization of the grid or net can be done by either reversible or irreversible chemical reactions to couple linker rods. For example, a weakly bonded grid or net can be generated by hydrogen bonding of carboxylic acid dimers at rod ends:

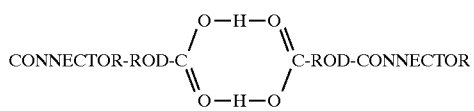

Carboxylic acid dimer links exemplify reversible polymerization reactions. Dimer formation is reversible, for example, by adjusting pH to break and reform dimers or by heating, so that defects in grid formation can be annealed. Hydrogen bonded grids are not preferred for grids that are intended to be removed from the surface on which they are formed. However, hydrogen bonds can provide the initial reversible grid couplings to form the regular grid which are then replaced in a controlled fashion by irreversible bonds to form a sturdier (more strongly bonded) grid.

Irreversible covalent links between rods are exemplified by coupling of acetylene groups at rod ends:

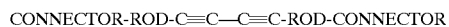

A variety of reversible and irreversible processes can be employed to polymerize the net (i.e., link or couple the rods) including among others: oxidative coupling of end groups (e.g., acetylene end groups) coupling of carborane rods via mercury cation:

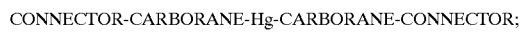

dimerization of carboxylic acid rod ends via an intermediate divalent metal cation; bonding of other rod end groups via metal cations; chelation of metal cations by rod end groups, in particular chelation of Ni or Pd divalent cations with acetyl acetone or malonic dialdehyde end groups, for example:

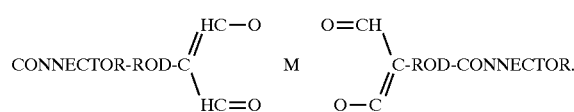

Methods for rod or arm couplings described above are generally well known in the art. For example, carborane arms or rods can be coupled in a two-step process: treatment with a strong base followed by addition of a Hg(II)salt (Zakharkin et al. (1965) J. Organometal. Chem. 4:211) or in a one-step process by treatment with t-BuOK and Hg(II) in DMF in the presence of excess bromide anion.

After the polymerization and after any optional annealing or bridging steps are applied, the single-layer net structure can be removed from the interface either by removal of (or chemical modification of) the high surface affinity substituents on the tentacles, or by destruction or chemical or physical modification of the interface surface. For example, a selective reagent can be added to cleave or chemically modify substituents on the tentacle, or cleave the tentacle from the monomer. Alternatively, a metal surface could be dissolved or chemically modified to release the net structure. Removal of the tentacle ends releases the single-layer net or grid from the interface. If appropriate functionality is provided, the pedestal portion of the monomer can then be polymerized using methods similar to those described above to generate a second net layer and form a two-layer or two-ply net. FIG. 2(c) illustrated the formation of a two-layer hexagonal grid or net. The position of the pedestal connectors in the grid is the same as those in the first grid layer, but the size, geometry of and number of rods bonded to the pedestal connectors need not be the same as those in the first grid layer. Several illustrations of various shapes of single and two-ply grid structures are provided in FIG. 6.

FIG. 2(d) gives structures of representative trigonal monomers with three carborane linking rods. Carborane rods of these representative monomers can be polymerized via Hg. The thioether tentacles of representative building block A were chosen for their high affinity for certain metal surfaces including gold (Au) or liquid mercury. The tentacles were attached to the pedestal connector via a Si—C bond which can be readily cleaved, for example, by treatment with fluoride anion to remove the tentacles.

Figure 5:
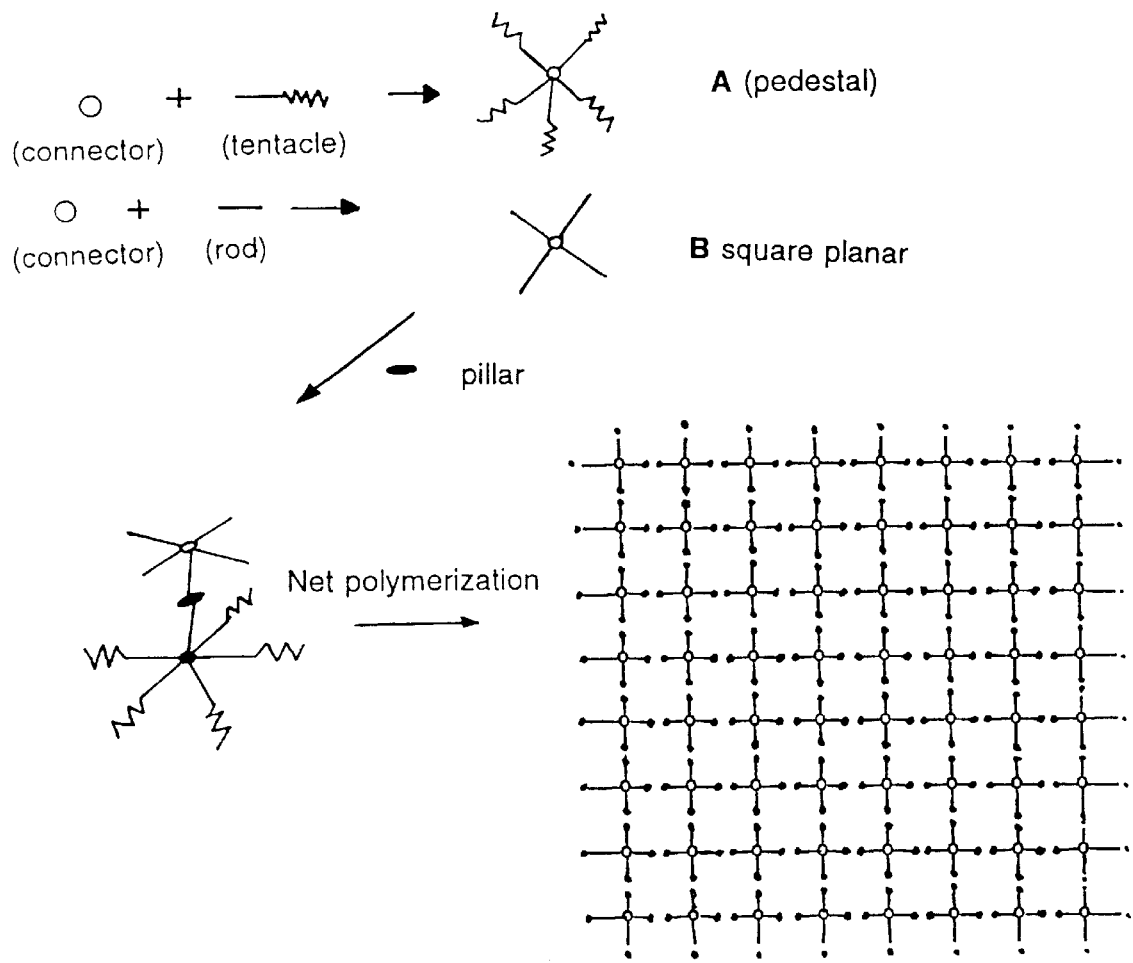
FIG. 5 schematically illustrates synthesis of a square grid (top view of grid is given) with a square planar monomer. A representative square planar monomer, a substituted tetraphenylcyclobutadienecobalt complex with a pentasubstituted cyclopentadienyl pedestal, is shown.
Figure 5:
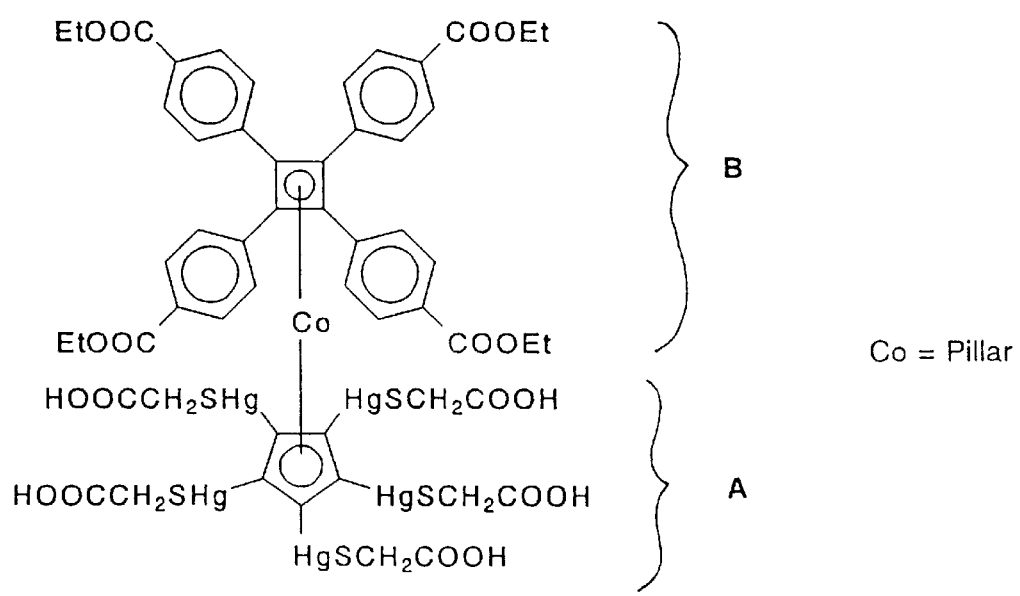

FIG. 5 illustrates a square grid formed from a monomer having a square planar CON group, i.e. a square planar connector with four linking rods. FIG. 5 also illustrates a representative square planar monomer, a cyclobutadienecyclopentadienyl cobalt complex.

Figure 6:
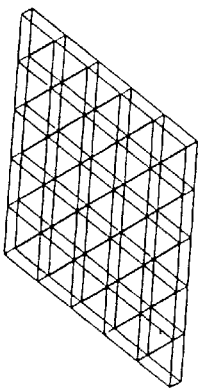
FIG. 6 schematically illustrates single-layer nets or grids of several different geometries and corresponding double-layer scaffolding structures.
Figure 6:
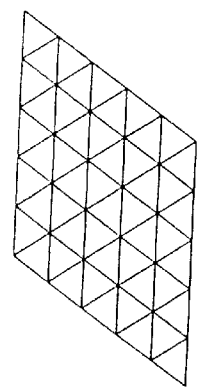
Figure 6:
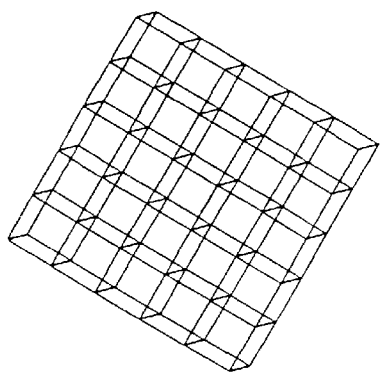
Figure 6:
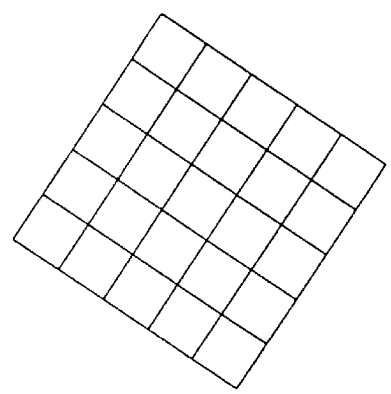
Figure 6:
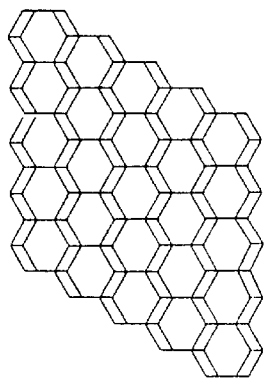
Figure 6:
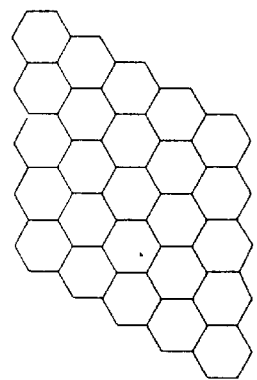

FIG. 6 illustrates exemplary schematic views of grid or net geometries or patterns and corresponding two-layer scaffolding structures. A single- or double-layer net can be used as a template for synthesis of more complex molecular structures, including multi-layer nets, e.g. scaffolding.

The size of a resulting net sheet will be limited by the size of the interface or metal surface used. The surface area of actual grid may be smaller than the interface employed for synthesis. The structure of the net array synthesized will depend on the number of linking arms on the monomer. There may be applications in which it will be desirable to have domains or islands of polymerized grid on a larger surface. The use of monomers with four linking groups will result in a polymerized square net or grid, see FIG. 5. The size and shape of the holes (pores) in the net will depend on the number of linker and anchor arms, the length of those arms and the type of coupling agent used.

Square Planar Monomers

The basic tetraphenylcyclobutadienecyclopentadienylmetal structure:

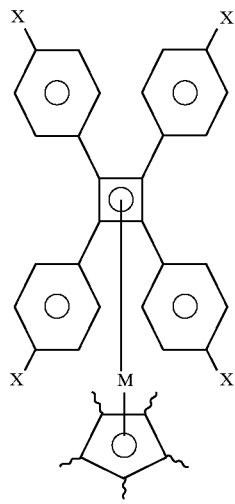

where M is, for example, Co(I) or Rh(I), is well suited for design of monomer building blocks for square grids. The cyclobutadiene ring is square and pendant phenyl groups functionalized at the 4-position are well suited as rigid linker groups. The cyclobutadiene and cyclopentadienyl (Cp)rings are parallel, making the latter well suited for the addition of tentacles to form the pedestal of a monomer for use in the methods of this invention. The complex is thermally stable and chemically resistant to a range of reagents.

A standard approach to synthesis of tetraphenylcyclobutadienecyclopentadienylcobalt complexes relies on the dimerization of diphenylacetylene, or one of its derivatives, in the presence of an organometallic cobalt compound, such as $CpCo(CO)_2$. (Rausch, M. D.; Genetti, R. A. (1970) J. Org. Chem 35:3888; Nakamura, A; Hagihara, N. (1969) Bull. Chem. Soc. Jpn. 34:452; Uno, M. et al. (1994) J. Organometal. Chem. 473:303.) A number of tetraphenylcyclobutadienecyclopentadienylcobalt complexes which are substituted on the phenyl rings of the cyclobutadiene ring and on the cyclopentadiene ring have been prepared in efforts to synthesize square planar monomer precursors to square molecular grids or nets. For example, a method of penta-substituting the cyclopentadiene ring of the cobalt complexes via mercuration, described in the Examples has resulted in a range of complexes. A number of complexes functionalized on the square ring have been prepared by dimerization of 4,4'-disubstituted diphenylacetylenes with cyclopentadienyl cobalt dicarbonyl. These methods facilitate simultaneous functionalization of both rings in the cobalt complexes.

Schemes 1–4 illustrate a basic synthetic approach to the cobalt complex monomers. See, A. Efraty (1977) Chem.Rev. 77:691. A cyclobutadiene connector (square planar) with four para-substituted phenyl ring rods is created (Scheme 2) in a single reaction of functionalized tolans (Scheme 1) with a cyclopentadienylcobalt-dicarbonyl. This generates a star connector. Thereafter, substituents on the phenyl rings can be chemically modified to other groups useful for polymerization of linker rods moieties or for extension of the rod by addition of further para-linked phenyl rings or other rod-like moieties (Scheme 3). Tentacle groups having affinity for interfaces, for example for liquid mercury surfaces, can be introduced onto the cyclopentadienyl ring of the cobalt complex before or preferably after reaction with tolans (Scheme 4).

Alternatively, tetraphenylcyclobutadienecyclopentadienylcobalt, (1) in Scheme A, or analogous complexes having para-substituted phenyl rings, can be derivatized as illustrated in the exemplary reactions of Schemes A–C. Scheme C illustrates introduction of mercuriomercaptoacetic acid groups on the cyclopentadiene ring. The reaction illustrated in Scheme C and routine modifications thereof can be employed to introduce a number of different tentacle groups via alkylthiol derivatives. Tentacle groups of the cobalt complex monomers are provided with COOH or halide groups with high affinity for metal surfaces including liquid mercury.

Scheme 3 illustrates methods of synthesizing square planar connectors with phenyl ring rods in certain cobalt complexes and the combination of the methods of Scheme 2 to generate representative monomers. Specific details of these synthetic methods are provided in the Examples. The illustrated methods, or routine modification and adaptation of these methods, in combination with synthetic methods well known in the art can be employed to add tentacle groups and or linker rod groups to cyclopentadienyl connectors and square planar phenyl ring connector/linker rods to prepare a variety of cobalt complexes.

Specific square planar monomers of this invention that can be synthesized by methods well known in the art, by methods disclosed herein or by routine adaptation or modification of those methods include:

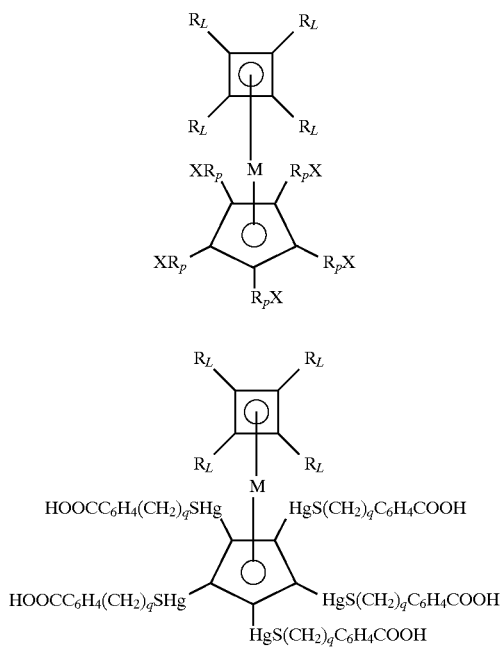

IIIA

IIIB where $R_L$ is a linker rod with an end group that can be coupled to other linker rods including but not limited to para-substituted phenyl or biphenyl groups, bicyclo[2.2.2] octane and its dimers, trimers and tetramers, [1.1.1] polypropellane and its oligomers, 10-vertex and 12-vertex p-carboranes and their oligomers. $R_L$ end groups include carboxylic acid and ester groups and halide. $R_PX$ groups include $R_P$ that are rods such are those listed for $R_L$ immediately above and those in which X has high affinity for bonding to metal surfaces, particularly liquid mercury surfaces and particularly those comprising a carboxylic acid, thioether, or halide group;

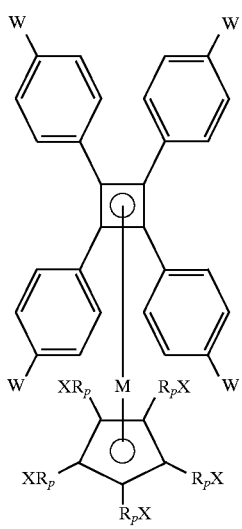

IIIC

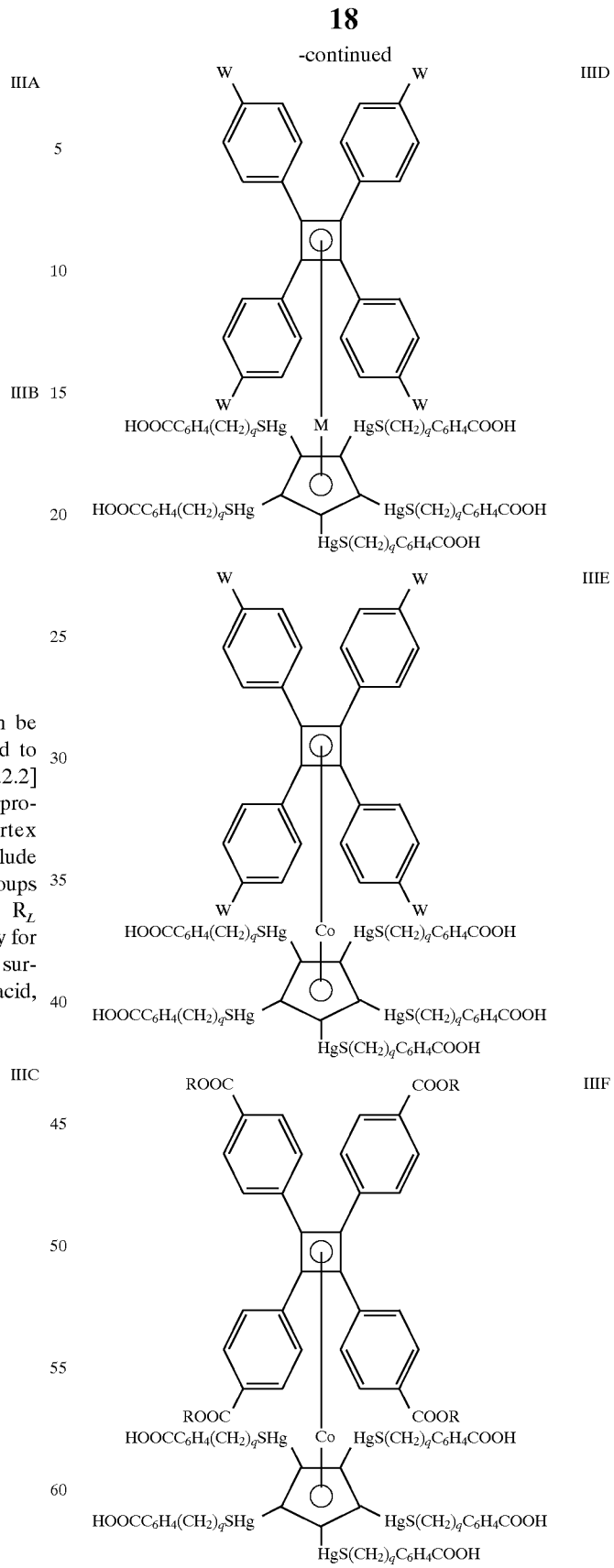

IIID

IIIE

IIIF

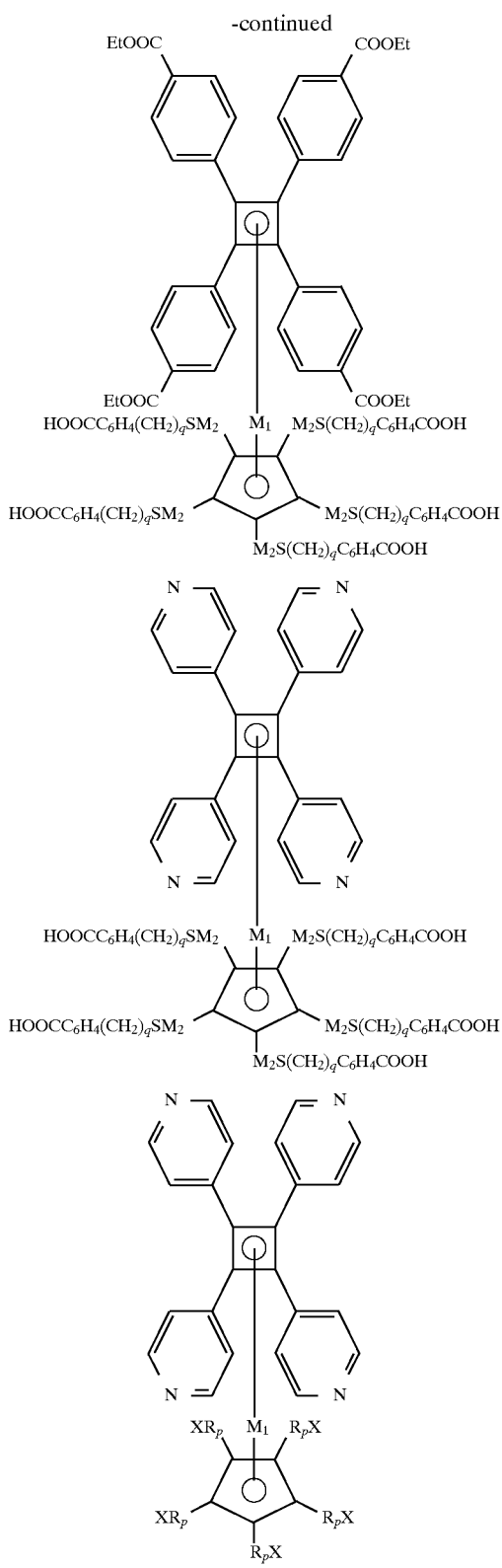

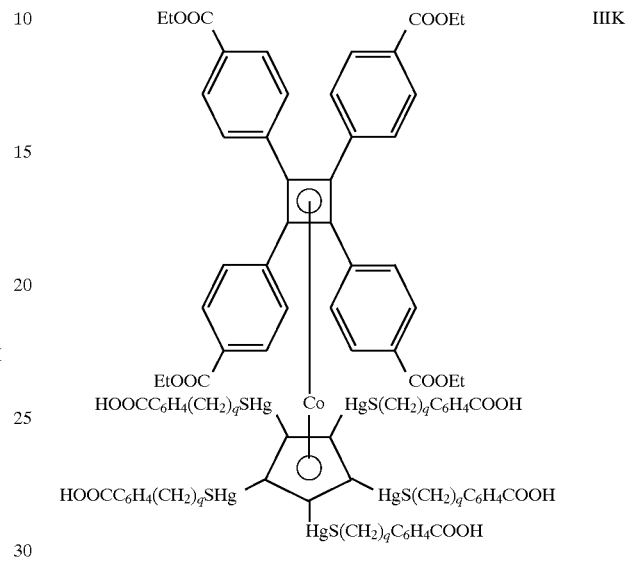

where M and $M_1$ are metal cations, for example Co(I) or Rh(I); W is a functional moiety capable of linking to other rods, such as a COOH or ester group, or W is a rod-like extension such as a carborane monomer or oligomer or an alicyclic monomer or oligomer (as described herein) capable of linking to other rods; $R_PX$ groups include $R_P$ that are rods such are those listed for $R_L$, listed above and those in which X has high affinity for bonding to metal surfaces, particularly liquid mercury surfaces and particularly those X comprising a carboxylic acid, thioether, or halide group; q is an integer from 1 to about 10, preferably 1 to about 6; and most preferably 1 to 3. R is an alkyl group, preferably a small alkyl group having 1 to about 4 carbon atoms. In IIIG and IIIH, $M_2$ can be Hg, Li or Mg.

More specific square planar monomers include:

With regard to the specific synthesis of square-planar complexes described herein, reaction of five equivalents of mercury(II) acetate with 6 under a variety of conditions generally gave a mixture of complexes with one to five mercury substituents on the Cp ring. Conditions were not found for full conversion to the permercurated product using the acetate. Separation of the various mercurated products was found to be difficult. However, reaction of 6 with the more electrophilic mercury (II) trifluoroacetate gave a good yield of a pentakis product.

Cross-coupling reactions of the pentaiodo derivative 16 with acetylenes did not lead to the desired acetylene derivatives. The presently preferred route for further derivatization of the Cp ring in such complexes is via reaction of the reaction of the permercurated derivatives such as 13, 14 and 15.

The tetrapyridyl derivative 6a cannot be readily mercurated on the Cp ring employing mercury(II) trifluoroacetate.

The tetra(p-bromophenyl) derivative 7 provides access to many other derivatives through the use of transition metal catalyzed cross-coupling reactions, for example, palladium catalysed cross-coupling (Sonogashira, K. in Comprehensive Organic Synthesis, Trost, B., Fleming, I. (Eds.) Pergamon Press (1991) Vol 3, Chapter 2.4, p.521 and references therein.).

Trigonal Monomers

Representative trigonal monomers, which are precursors to hexagonal nets, are exemplified in FIG. 2. These monomers comprise trisubstituted benzene rings as linker and pedestal connectors and can be generally described by the formula:

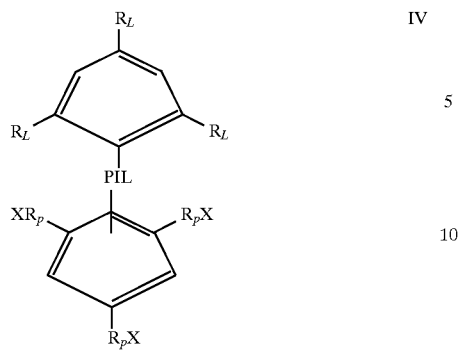

IV

In general any $R_L$ or $R_PX$ groups described herein can be used in the synthesis of this class of trigonal monomers. The pillar (PIL) linking the benzene connectors can be a metal atom, metal ion or complex, including dimetal sandwich complexes or mixed dimetal sandwich complexes.

More specifically, trigonally monomers of this invention include those in which $R_L$ and $R_P$ comprise p-carborane monomers and oligomers, particularly dimers, trimers and tetramers, as well as rods which combine carboranes with aromatic rings and alicyclic rings or other rod groups, such as carboranes combined with bicyclo [1.1.1] pentane or acetylenes. Trigonal connectors are 1,3,5-trisubstituted benzene rings. Free ends of linker rods $R_L$ are preferably C—H or C-halide (particularly I). The former can be activated for coupling reactions by the presence of a base, the latter by alkyl lithium or by electrochemical reduction.

Preferred pillar groups for these trigonal monomers are dimetallo sandwich complexes (triple-decker sandwiches) containing two Ru(II) atoms or a Ru(II) and a Fe(II) atom with a central ring, such as a dicarbapentaborane ring, as the central deck. C. T. Kresge et al. (1992) Nature 359:710. The central ring can carry substituents if desired. Addition of appropriate substituents on this central ring can be employed to vary the size of the pores in the net.

The preferred linear couplers for linker rods is the Hg(II) atom or direct C—C bonds. Mercury atoms may be photochemically extruded after the completion of grid synthesis without losing rod integrity.

The specifically disclosed trigonal monomers of this invention are intended for use on liquid mercury or mercury amalgam surfaces. Thus preferred tentacles are mercurophilic and can include aromatic-COOH, thioether and halide groups. Specific trigonal monomers have tentacles that are trialkylsilyls groups carrying one or more thioether groups.

Porphyrin-based monomers

Derivatized porphyrin rings can be used as connector units in monomers useful for grid synthesis by the methods of this invention. One porphyrin ring is substituted with tentacle groups $R_PX$, as discussed above, that have an affinity for an interface, e.g., a metal surface, for example, COOH groups, thioethers or halides. Aromatic COOH groups and sulfur-containing groups have a particularly high affinity for mercury surfaces (mercurophilic groups). A second porphyrin is substituted with linking rod groups $R_L$, as discussed above, which are capable of being linked to rod end groups of other monomers. Aromatic rods, such as para-substituted phenyls, biphenyls and polyphenyls, as well as heterocyclic aromatic rings such as pyridinyl, bipyridinyl, polypyridinyl rods, are particularly attractive in the case of porphyrin connectors.

Useful porphyrin-based monomers include:

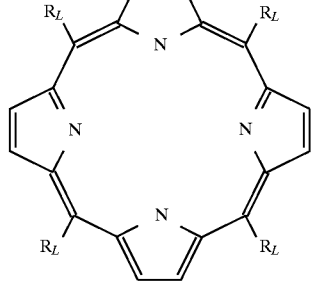

La

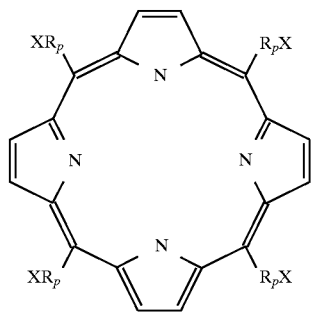

VA

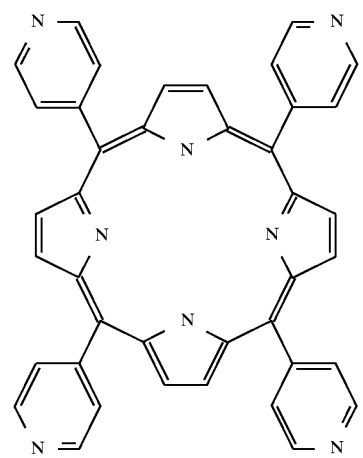

La

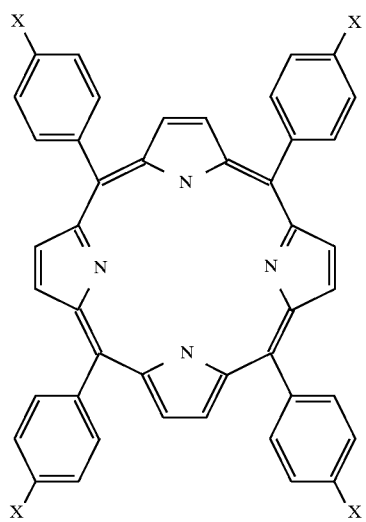

VB

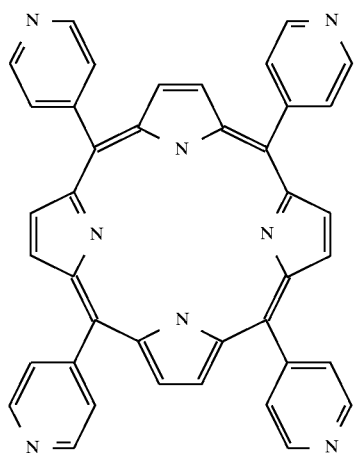

HOOC COOH and

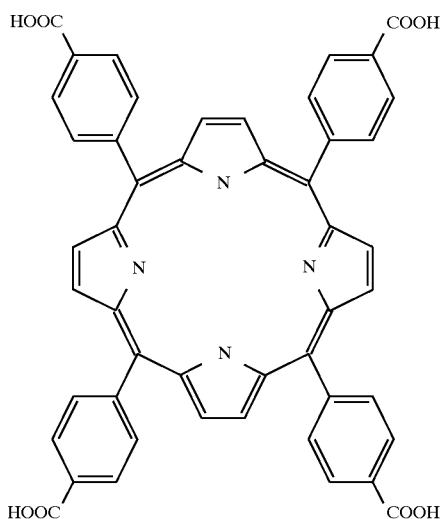

HOOC COOH

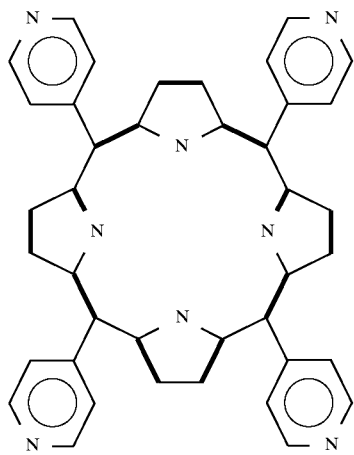

VC

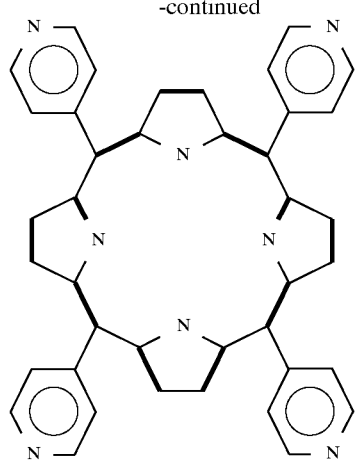

VD where La represents any lanthanide metal ion including lanthanum itself and $R_L$, $R_P$ and X are as defined above.

Porphyrin metal complexes are discussed generally in J. W. Buchler et al. 1986 *J.Amer.Chem.Soc.* 108,3652; and J. W. Buchler and M. Knoth in *"Optical Properties and Structure of Tetrapyroles,"* (G. Blauer and H. Sand, eds), deGruyter, Berlin 1985, p.91.

Porphyrin-containing monomers including those illustrated above are prepared by mixing an appropriate metal (III) salt, e.g. a lanthanide metal (particularly La(III)) salt, with a stoichiometric amount of the pedestal porphyrin and an excess of the CON group porphyrin in an appropriate solvent. A mixture of metal porphyrin complexes results with the complex having two CON group porphyrins and the complex having one CON group porphyrin and one pedestal porphyrin predominating. The target mixed porphyrin complex is isolated from the mixture by taking advantage of the pedestal group's high affinity for metal surfaces. The target complex binds to a metal surface, e.g. a liquid mercury surface, while the other does not.

Porphyrins derivatives with $R_L$ and $R_PX$ substitutions can be prepared by methods well known in the art or by routine modifications of those methods. A number of derivatized porphyrins, including those where $R_PX$ is phenyl-$CO_2H$ and those where $R_L$ is pyridinyl are commercially available or routinely prepared from commercially available starting materials.

Pyridinyl linker rods of the porphyrin connector can be coupled to other linker rods in a number of ways, for example, via quaternization with reagents such as 1,4-diiodobutane, through $MX_2$ metal dihalide or dicyanide units, such as $NiCl_2$ or using irreversible coupling group, p-xylene dibromide.

Monomer VD contains pyridine rings as both linking arms for coupling to other monomers and as tentacles to adhere to a liquid Hg surface. Reflectance IR of VD on a Hg surface in which the in-plane vibration of the porphyrin ring (1003 $cm^{-1}$) is absent and the out-of-plane vibration (870 $cm^{-1}$) is present, indicates that the monomer resides on that surface with the porphyrin rings parallel to the surface. The IR also indicates that the pyridine rings are somewhat twisted with respect to the porphyrin plane.

Surface adsorbed monomer VD can be treated with the irreversible coupling agent p-xylene dibromide. This agent is expected to quaternize the pyridine rings of connectors of adjacent monomers and form a kinked —$CH_2$—$C_6H_4$—$CH_2$— link connecting the pyridines. Reflectance IR of VD adsorbed to a Hg surface and treated with p-xylene dibromide indicates the pyridine vibrations are replaced with those characteristic of alkylpyridinium rings. Vibrations attributable to the benzene ring of the coupling group indicate that the benzene is oriented nearly perpendicular to the surface. Reappearance of the in-plane porphyrin vibration after coupling is presumably due to irregularities in the coupling process and can be employed to optimize coupling reaction conditions to form the regular grid.

The methods and compounds of this invention can be applied generally to nano-scale molecular construction. In particular, this invention provides for the construction of thin-layer materials and more complex nano-scale structures, e.g. scaffolding, useful in the electronics, optics and communications industries and in separations technology. The two-dimensional grids or nets of this invention are useful as templates for the synthesis of more complex materials with controlled molecular architecture, for example, structures having two, three and more layers of regular grids or nets.

Grids, nets and scaffolding structures with controlled molecular-size pores are useful for extremely rapid, diffusion-controlled) separations by molecular size. Molecular grids would be mounted, for example, on fine mesh material or coarsely porous polymer material or similar sturdy structures in separation applications. A demonstration of the use of a Langmuir-Blodgett multilayer made of a calixarene derivative ("perforated membrane") has appeared (Conner, M. et al. (1993) *J. Am. Chem. Soc.* 115: 1178; Lee, W. et al. (1995) *J. Am. Chem. Soc.* 117:10599. The molecular grid structures can optionally be functionalized to impart chemical, friction, electronic, biocompatibility or other properties. For example, grids can be derivatized to make then more or less hydrophilic or hydrophobic in nature. Active groups can be introduced into the grids or scaffolding, for example, groups which function as charged turbines for the coupling of gas flow with a magnetic or electromagnetic field or groups which function as dipolar turbines for the translation of circularly polarized microwaves into gas pressure and vice versa. U.S. Pat. No. 5,405,550 discusses the use of turbines in nano-sized molecular structures.

The methods provided herein allow synthesis of ultrathin (15 –20 Å) membranes with well-defined pore size (ranging from about 5 to 50 Å) that are regularly, covalently cross-linked and strongly solvent and temperature resistant. In practice, it may be beneficial to deposit the ultrathin membranes on a fine mesh for mechanical support and/or to use a stack of such membranes.

Net structures used for separation of this invention can be functionalized around the edge of each pore to preferentially bend certain constituents of a mixture to be separated. The functionalized nets can then be used as affinity membranes for separations based not only on molecular size alone, but also based on affinity for the functional group.

The following examples illustrate the invention and are in no way intended to limit the scope of the invention.

EXAMPLES

Synthesis of Square Planar Monomers

Example 1

Synthesis of Cyclobutadienecyclopentadienyl Cobalt Complexes

All reagents were purchased from Aldrich, with the exception of ethyl 4-iodobenzoate (TCI America) and p-carborane (Katchem, Prague, Czech Republic) and were used as supplied. All solvents were analytical grade, and freshly distilled before use. Tetraphenylcyclopentadienylcyclobutadiene cobalt (6) and cyclopentadienylcobalt dicarbonyl ($CpCo(CO)_2$) were prepared by the method of Rausch (M. D. Rausch and R. A. Genetti, 1970 *J.Org. Chem.*, 35, 3888; and M. D. Rausch and R. A. Genetti, 1967 *J. Am. Chem. Soc.* 895, 5502). Melting points were determined on a Boëtius micro heating stage with PHMK 05 viewing device.

The synthesis of square planar monomers is illustrated in Schemes 1–4.

4,4'-Dibromodiphenylacetylene (1)

1-Bromo-4-iodobenzene (12.5 g, 44 mmol), CuI (57 mg, 0.22 mmol), $PdCl_2(PPh_3)_2$ (210 mg, 0.03 mmol) and diethylamine (200 mL) were added to a 500 mL 3-neck flask fitted with a nitrogen inlet, a gas inlet directly into the reaction mixture, and a gas outlet. The reaction vessel was purged with nitrogen, then a steady stream of acetylene was bubbled through the solution for 7 h, and the mixture was left to stir overnight. The solvent was removed under reduced pressure to give a brown powder. This powder was dissolved in a mixture of dichloromethane (300 mL) and dilute hydrochloric acid (2M, 200 mL), and transferred to a separatory funnel. After extraction, the organic layer was separated, and the aqueous layer was extracted with dichloromethane (2×50 mL). The combined organic fractions were washed with water (2×100 mL), dried over sodium sulfate, and the solvent was removed to give a brown powder. The crude product was chromatographed (silica gel, dichloromethane/hexane, 30:70% by volume), then recrystallized from chloroform to give 1 as white crystals (4.54 g, 61%), Mp. 181°–182° C. (lit. Mp. 182°–184° C.).

4,4'-Diiododiphenylacetylene (2)

1,4-Diiodobenzene (15.0 g, 45 mmol), CuI (100 mg, 0.30 mmol), $PdCl_2(PPh_3)_2$ (210 mg, 0.30 mmol) and diethylamine (100 mL) were added to a 250 mL 3-neck flask. A glass tube was inserted into the flask through a rubber septum and was positioned to extend well below the surface of the solvent. A balloon filled with acetylene gas was attached to the end of the glass tube. A small purge valve was fitted to the second neck of the flask, and the third neck was stoppered. A slow stream of acetylene from the balloon was passed through the stirred reaction mixture over approximately 5 h, resulting in the formation of a yellow precipitate. Typically, about 2 L of acetylene were used. The solvent was removed and the crude product was twice recrystallized from toluene to give pure 2. On a typical run, the yield of 2 was 4.08 g (42%). Yields as high as 50% were obtained, but it was found that insoluble polymeric materials were usually formed when excess acetylene was used in an attempt to increase the yield. Mp. 239°—239° C. (lit. Mp. 237°–238° C.).

4,4'-(Diethoxycarbonyl)diphenylacetylene (3)

Ethyl 4-iodobenzoate (11.1 g, 40 mmol), $PdCl_2(PPh_3)_2$ (315 mg, 0.45 mmol), copper(I) iodide (171 mg, 0.9 mmol) and diethylamine (400 mL) were added to a 500 mL 3-neck flask fitted with a nitrogen inlet, a gas inlet directly into the reaction mixture, and a gas outlet. The reaction vessel was purged with nitrogen, then a steady stream of acetylene was bubbled through the solution for 7 h, after which time the mixture was left to stir overnight. The solvent was removed, the residual powder was dissolved in a mixture of dichloromethane (300 mL) and dilute hydrochloric acid (2M, 200 mL), and transferred to a separatory funnel. After extraction, the organic layer was separated, and the aqueous layer was extracted with dichloromethane (2×50 mL). The combined organic fractions were washed with water (2×100 mL), dried over sodium sulfate, the solvent was removed, and the crude product was chromatographed (silica gel, dichloromethane/hexane, 1:1), then recrystallized from dichloromethane/hexane to give 3 as white crystals (4.57 g, 70%). Mp. 147°–148° C.

Bis[4-(1,12-dicarba-closo-dodecaboran-1-yl)phenyl]acetylene (4)

1,12-Dicarba-closo-dodecaborane (837 mg, 5.8 mmol) was dissolved in THF (50 mL) in a 100 mL 2-neck flask, and the solution was cooled to −30° C. n-Butyllithium (1.6M in hexane, 3.6 mL) was added to the solution via syringe over 5 min. The mixture was allowed to warm to rt over 1 h and was stirred for a further 4 h. The solution was again cooled to −30° C., and CuI (580 mg, 5.8 mmol) was added to the solution. After slowly warming to rt, the mixture was heated to 50° C. for 14 h to give a dark brown solution. On cooling, the solvent was removed under reduced pressure. N-Methyl-2-pyrolidinone (30 mL), $Pd_2C_2(PPh_3)_2$ (75 mg, 0.11 mmol) and 2 (1.0 g, 2.3 mmol) were added to the reaction vessel, and the solution was heated at 100° C. for 18 h. On cooling, the mixture was transferred to a separatory funnel, and hexane (150 mL) and dilute hydrochloric acid (150 mL) were added to the mixture. After extraction, the organic layer was collected, and the aqueous layer was again extracted with hexane (100 mL). The combined organic fractions were extracted with dilute hydrochloric acid (3×75 mL) and dried over sodium sulfate. After removal of the solvent, the residue was chromatographed (silica gel, hexane). 1,12-Dicarba-closo-dodecaborane (118 mg) was isolated as the first fraction from the column. Pure 4 (260 mg, 25%) was next to elute from the column. Phenyl [4-1,12-dicarba-closo-dodecaboranyl-1-yl)phenyl]acetylene (5) then eluted from the column (44 mg, 6%). Both were recrystallized from EtOH. For 4, Mp. 231°–232° C.; For 5, Mp. 132°–133° C.

Tetraphenylcyclobutadienecyclopentadienylcobalt (6)

Diphenylacetylene (2.94 g, 16.5 mmol), freshly distilled $CpCo(Co_2)$ (1.49 g, 8.3 mmol) and xylene (80 mL) were added to a 250 mL round bottom flask and heated under reflux for 22 h under argon atmosphere in the dark. After cooling, the solution was poured directly onto a dry silica column, and the orange band at the solvent front was eluted with benzene. The solvent was evaporated and the solid residue was washed with pentane (100 mL). The residue was then rechromatographed on silica gel (eluent, benzene) to give yellow crystals of 6 (3 g, 75%). The product was then recrystallized from benzene and heptane. Mp. 262° C. (lit. Mp. 262°–264° C.).

Tetra(4-pyridyl)cyclobutadienecyclopentadienylcobalt (6a)

4,4'-Dipyridylacetylene (4.86 g, 27 mmol), $CpCo(CO)_2$ (2.44 g, 13.6 mmol) and xylene (240 mL) were added to a 500 mL round bottom flask and heated under reflux for 24 h under argon atmosphere in the dark. After cooling, the solvent was evaporated and the solid residue was washed with a few mL of a mixture of acetone and pentane (1:1). The solid was chromatographed on silica gel (eluent: $CHCl_3$/EtOH, 4:1 by volume). Crude 6a was eluted first followed by 6b (infra). The former was then rechromatographed on silica gel ($CHCl_3$/EtOH, 85:15) to give pure 6a (0.95 g, 15%). The product 6a was recrystallized from chloroform and pentane. Mp. 330° C. (dec, change of color).

Tetra(4-pyridyl)cyclopentadienonecyclopentadienylcobalt (6b)

After chromatography on silica gel, the solvent was evaporated and the solid residue was washed with a few mL of acetone and recrystallized from chloroform and pentane to give dark red crystals of 6b (3.47 g, 50%). Mp. 270°–280° C. (dec, change of color).

Tetra(4-bromophenyl)cyclobutadienecyclopentadienylcobalt (7)

$CpCo(CO)_2$ (1.0 g, 5.5 mmol), 1 (2.73 g, 8.125 mmol) and xylene (80 mL) were added to a 200 mL round bottom flask, and heated to a gentle reflux for 24 h under argon atmosphere in the dark. On cooling, the reaction mixture was poured directly onto a dry silica column, and the orange band at the solvent front was eluted with hexane. The orange band was collected, and rechromatographed on silica gel. Unreacted 1 (380 mg) was first to be eluted with hexane and 7 was eluted with hexane/dichloromethane (3:1). Recrystallization of the crude product, from benzene/hexane gave pure 7 as brown crystals (1.08 g, 46% based on 1 consumed). Mp. 307°–308° C.

Tetra(4-iodophenyl)cyclobutadienecyclopentadienylcobalt (8)

$CpCo(CO)_2$ (233 mg, 1.24 mmol), 2 (1.07 g, 2.48 mmol) and xylene (50 mL) were added to a 100 mL round bottom flask and heated to a gentle reflux for 24 h under argon atmosphere in the dark. On cooling, the reaction mixture was poured directly onto a dry silica column, and the orange band at the solvent front was eluted with chloroform and rechromatographed (silica gel, hexane). Unreacted 2 was eluted first. The second band contained 8 mixed with 2, and was rechromatographed (silica gel, hexane) to give pure 8 (102 mg, 8%). Recrystallization from benzene/hexane gave orange-brown crystals. Mp. 300°–301° C. (dec with evolution of iodine.

Tetra(4-ethoxycarbonylphenyl)cyclobutadienecyclopentadienylcobalt (9)

3 (0.42 g, 1.3 mmol), $CpCo(CO)_2$ (117 mg, 0.65 mmol) and xylene (50 mL) were added to a 100 mL round bottom flask and heated under reflux for 20 h under argon atmosphere in the dark. A precipitate formed on cooling to 0° C. which was collected on a frit and washed with hexane. The solid residue was chromatographed (silica gel $CHCl_3$) to give pure 9 (0.36 g, 72%). Crystallization from toluene gave 9 as a red-orange crystals. Mp. 282°–284° C.

Tetrakis[4-(1,12-dicarba-closo-dodecaboran-1-yl)phenyl]cyclobutadienecyclopentadienyl cobalt (10)

4 (250 mg, 0.54 mmol), $CpCo(CO)_2$ (100 mg, 0.55 mmol) and xylene (50 mL) were added to a 100 mL round bottom flask and heated to a gentle reflux for 24 h under argon atmosphere in the dark. After cooling, $CpCo(CO)_2$ (100 mg, 0.55 mmol) was added, and the mixture was again heated under reflux for 24 h. More $CpCo(CO)_2$ (100 Mg, 0.55 mmol) was added to the cooled solution, and the reaction was heated under reflux for 72 h. After cooling, the reaction mixture was poured directly onto a dry silica column, and the orange-brown band at the solvent front was eluted with hexane and rechromatographed (silica gel, hexane). A trace of unreacted 4 was first to be eluted from the column, followed by an unidentified blue band. 10 was eluted as a yellow band, which on removal of the solvent, gave pure 10 (152 mg, 54%) as a yellow powder. Dark red crystals were obtained by slow evaporation from a mixture of dichloromethane and ethanol. Mp.>300° C.

Tetra(4-carboxyphenyl)cyclobutadienecyclopentadienylcobalt (11)

9 (200 mg, 0.26 mmol), sodium hydroxide (1.0 g, 25 mmol,) THF (20 mL), and water (30 mL) were added to a 100 mL round bottom flask and heated under reflux for 20 h. After cooling, conc. hydrochloric acid was added to the stirred mixture until the solution became acidic. Water (50 mL) was added to the solution, and the THF was removed by evaporation to give an orange precipitate, which was collected on a frit. The crude material was recrystallized from EtOH at −70° C. to give 11 (120mg, 71%) as an orange powder. An analytical sample was prepared by a recrystallization from EtOH/H$_2$O. Mp.>300° C.

Tetrakis[4-(triethylsilylethynyl)phenyl]cyclobutadienecyclopentadienylcobalt (12)

7 (200 mg, 0.25 mmol), triethylsilylacetylene (700 mg, 5.0 mmol), PdCl$_2$(PPh$_3$)$_2$ (50 mg, 0.07 mmol), CuI (25 mg, 0.13 mmol) and triethylamine (50 mL) were charged to a round bottom flask, cooled to −50° C. and degassed under high vacuum for 1 h. The reaction mixture was heated to a gentle reflux for 48 h under argon, and then cooled to room temperature. Triethylsilylacetylene (400 mg, 2.8 mmol), PdCl$_2$(PPh$_3$)$_2$ (50 mg, 0.07 mmol), and CuI (25 mg, 0.13 mmol) were added, and the mixture was refluxed for 48 h. After cooling to room temperature, triethylsilylacetylene (400 mg, 2.8 mmol), PdCl$_2$(PPh$_3$)$_2$ (50 mg, 0.07 mmol), and CuI (25 mg, 0.13 mmol) were added, and the reflux was continued for a further 96 h. On cooling, hexane (30 mL) was added to the solution, and the mixture was filtered into a separatory funnel. The solid black residue was washed with hexane (70 mL), and the yellow washings were added to the separatory funnel. The mixture was extracted with dilute hydrochloric acid (2×100 mL) and water (100 mL), dried over sodium sulfate and the solvent removed to give a dark orange/brown oil. This was chromatographed (alumina, hexane, then hexane/dichloromethane, 9:1). Elution of the orange band gave pure 12 (149 mg, 58%) as an orange powder, which was recrystallized from ethanol to give long orange needles. Mp. 210°–212° C. (dec).

Tetraphenylcyclobutadienepentakis(trifluoroacetoxymercurio)cyclopentadienylcobalt (13)

The cobalt complex 6 (1.95 g, 4.07 mmol) was dissolved in 1,2-dichloroethane (300 mL). Mercury (II) trifluoroacetate (9.02 g, 21.17 mmol) was added in portions over 15 min. The solution turned dark red and was stirred for 18 h at room temperature, after which time, a large amount of orange precipitate had formed. The reaction mixture was transferred to a separatory funnel and THF (50 mL) was added to give a clear organic fraction on shaking. If the THF is not added, an emulsion forms, and extraction becomes difficult. The organic solution was extracted with water (2×300 mL), and the solvent was removed to give an orange powder. Recrystallization of the crude product from EtOH/THF gave 13 (4.88 g, 60%) as deep red crystals. An analytically pure material was prepared by a second recrystallization from EtOH/THF. Mp. 226°–228° C. (dec).

Tetra(4-bromophenyl)cyclobutadienepentakis(trifluoroacetoxymercurio)cyclopentadienylcobalt (15)

The cobalt complex 7 (0.15 g, 0.19 mmol) was dissolved in freshly distilled 1,2-dichloroethane (20 mL). Then mercury (II) trifuloroacetate (0.43 g, 10 mmol) was added in portions over 5 min. The solution was stirred and heated at 70° C. under argon for 22 h. After cooling to room temperature the solvent was evaporated. The crude product was dissolved in a minimum of diethyl ether and pentane was added. Concentration of the solution afforded a yellow-brown precipitate (0.32 g, 73%) which was collected on a frit, washed with pentane and dried under vacuum. Mp. 195°–200° C. (dec, change of color).

Tetraphenylcyclobutadienepentaiodocyclopentadienylcobalt (16)

Potassium iodide (1.18 g, 7.1 mmol) and iodine (1.8 g, 7.1 mmol) were stirred in water (100 mL) for 2 h to prepare a solution of KI$_3$. 13 (2.79 g, 1.37 mmol) in THF (65 mL) was added to the solution, and the mixture was stirred for 2 days at room temperature. Most of the THF was removed under vacuum, the mixture was transferred to a separatory funnel, and extracted with toluene (3×100 mL). The combined organic fractions were extracted with aqueous sodium thiosulfate solution (2×100 mL), and water (2×100 mL), dried over Na$_2$SO$_4$, and the solvent removed to give an orange powder. The crude product was chromatographed (silica gel, dichloromethane/hexane, 30:70) and recrystallized from toluene to give 16 (747 mg, 49%) as orange crystals. Mp. 260°–280° C. (dec).

Tetra-(4-ethoxycarbonylphenyl)cyclobutadienepentakis[mercurio(mercaptoaceticacid)]cyclopentadienylcobalt 18

9 (150 mg, 0.195 mmol), mercury (II) trifluoroacetate (432 mg, 1.01 mmol) and 1,2-dichloroethane (20 mL) were charged to a 250 mL flask and heated under a gentle reflux for 24 hours. After cooling, hexane (200 mL) was added to the stirred solution to precipitate Tetra(4-ethoxycarbonylphenyl)cyclobutadienepentakis(trifluoroacetoxymercurio)cyclopentadienylcobalt (14), which was collected on a frit as an orange powder (308 mg, 68%). This material was not purified and was used directly in the next step. 14 (100 mg, 0.04 mmol) was dissolved in THF (5 mL) and mercapto acetic acid (50 µL, 0.75 mmol) was added to the solution from a syringe. The solution was stirred for 10 min, then hexanes (100 mL) were added to give an orange precipitate, which was collected on a frit and washed with hexanes to give 18 (28 mg, 31%) as an orange powder. Mp. 142°–143° C. (dec).

Tetra(4-(triethylsilylethynyl)phenyl)cyclobutadienecyclopentadienylcobalt (9)

Tetra(4-bromophenyl)cyclobutadienecyclopentadienylcobalt 7 (200 mg, 0.25 mmol), triethylsilyl acetylene (700 mg, 5.0 mmol), PdCl$_2$(PPh$_3$)$_2$ (50 mg, 0.07 mmol), CuI (25 mg, 0.13 mmol) and triethylamine (50 ml) were charged to a 1 neck round bottom flask, cooled to −50° C. and degassed under high vacuum for 1 hour. The reaction mixture was heated to a gentle reflux for 2 days. A final addition of triethylsilylacetylene (400 mg, 2.8 mmol), PdCl$_2$(PPh$_3$)$_2$ (50 mg, 0.07 mmol), and CuI (25 mg, 0.13 mmol) was carried out at this time, and the reaction mixture was heated under reflux for a further 4 days. On cooling, hexane (30 ml) was added to the solution, and the mixture was filtered into a separatory funnel. The solid black residue was washed with hexane (70 ml), and the washings were added to the separatory funnel. The mixture was extracted with dilute hydrochloric acid (2×100 ml), and water (100 ml), dried over sodium sulfate and the solvent removed to give a dark brown oil. The oil was chromatographed on alumina (hexane, then hexane/dichloromethane (10:1) as eluent). The tetra(4-(triethylsilylethynyl)phenyl)cyclobutadienecyclopentadienyl cobalt (12) eluted as an orange band to give 149 mg (58%) of orange crystals. The material can be recrystallized as long orange needles from ethanol/hexane.

Tetra(4-ethoxycarbonylphenyl)cyclobutadienepentakisiodocyclopentadienecobalt (17)

Tetra(4-ethoxycarbonylphenyl)cyclobutadienecyclopentadienylcobalt (9) (50 mg, 0.065 mmol), mercury (II) trifluoroacetate (145 mg, 0.35 mmol) and 1,2-dichloroethane were charged to a 1 neck flask and heated under a gentle reflux for 24 hours. On cooling, the solution was extracted with water (2×15 ml). THF (20 ml) was added to the organic layer, which was then dried over sodium sulfate. The solution was filtered into a flask, and KI$_3$ in H$_2$O is added to generate the pentakisiodo compound 17. Other halogen analogs with halogen substitution on the cyclopentadienyl ring can be generated by similar methods.

Example 2
Synthesis of Trigonal Monomers

Melting points were determined on a Boëtius micro heating stage with PHMK 05 viewing device. 1,12-Dicarba-closo-dodecaborane was purchased from Katchem, Prague, Czech Republic. Elemental analyses were performed by Desert Analytics, Tucson, Ariz. All reactions were carried out under nitrogen atmosphere with dry solvent, freshly distilled under anhydrous conditions unless otherwise noted. Yields refer to chromatographically and spectroscopically ($^1$HNMR) homogeneous materials, unless otherwise stated.

Synthesis of trigonal monomers is illustrated in Schemes 5 and 6.

1,3,5-Triiodobenzene [1,3,5-$C_6H_3I_3$]

1,3,5-Tribromobenzene (2.20 g, 7.0 mmol), KI (7.0 g, 42 mmol), Ni powder (4.0 g), $I_2$ (10.20 g), and DMF (25 mL) were added into a 100 mL round-bottom Schlenk flask. The flask was evacuated on the vacuum line at 0° C. for 15 min. The mixture was refluxed under $N_2$ at 185° to 190° C. for 3 h. After cooling, the solution was poured into a 500 mL separatory funnel. The flask was washed with 3% aqueous HCl (100 mL) and $CH_2Cl_2$ (100 mL) until all material, except for Ni powder, was transferred into the funnel. The $CH_2Cl_2$ layer was separated and the aqueous layer was extracted with $CH_2Cl_2$ (2×20 mL). The combined $CH_2Cl_2$ phase was washed with distilled water (3×50 mL) and dried over $MgSO_4$. The solvent was evaporated, leaving a light brown crude product (2.8 g). This residue was further purified by sublimation at 60° C. overnight to remove most $C_6H_3I_2Br$ (ca. 6%) and other impurities (ca. 6%). The residue, 1,3,5-triiodobenzene, was sublimed at 120° to 140° C. Yield, 2.38 g (75 %), purity 98% by NMR.

1,3,5-Tris(1,12-dicarba-closo-dodecaboran-1-yl)benzene (24)

1,12-Dicarba-closo-dodecaborane (22) (808 mg, 5.6 mmol) was added into a 250 ml three-neck round-bottom flask and CuCl (554 mg, 5.6 mmol) was introduced into a tip tube attached to the flask, (see: Papetti et al. 1966 I&EC Products Res. & Dvpt., 5, 34). After evacuation of the flask, THF (50 ml) was added under nitrogen. n-BuLi (3.5 mL, 1.6M in hexane, 5.6 mmol) was added at –30° C. After stirring at room temperature for 2 h, the CuCl was added from the tip tube to the solution at –30° C. and the reaction allowed to proceed for 1 h at room temperature (rt) and then for 2 h at reflux. The solvent was removed under reduced pressure. A clean tip tube was charged with 1,3,5-triiodobenzene (640 mg, 1.4 mmol) and attached to the flask. After evacuation, Pd(PPh$_3$)$_2$Cl$_2$ in N-methylpyrrolidinone (30 mL), made from 100 mg of PPh$_3$ and 40 mg of PdCl$_2$, was added through a syringe needle under nitrogen atmosphere. 1,3,5-Triiodobenzene was added from the tip tube. The reaction mixture was stirred for 16 h at 100° C. and then poured into $H_2O$ (20 mL) and extracted with toluene (4×30 mL). The combined organic phases were washed with brine and dried with MgSo$_4$. After removal of the solvent, product 24 (342 mg, 56%) was obtained by crystallization from a hexane—toluene mixture, leaving mostly 1-(p-carboranyl)benzene (3) and 1,3-(di-p-carboranyl)benzene in the mother liquor. For 24 Mp>320° C.

(3-Ethylthiopropyl)dimethylsilyl chloride (25)

To a mixture of 1-bromo-3-chloropropane (126 g, 0.80 mol), 50% aqueous NaOH (40 g, 0.50 mol) and Bu$_4$NBr (483 mg, 1.5 mmol) was slowly dropped ethanethiol (24.8 g, 0.40 mol) under vigorous stirring at 0° C. After stirring at room temperature for 2 h the organic layer was separated, washed twice with water (50 mL), dried over Na$_2$SO$_4$, and fractionally distilled. After a fraction of 1-bromo-3-chloropropane (35° C.–60° C./15 torr), 36.7 g (264 mmol, 66%) of 3-ethylthiopropyl chloride (25) (65° C.–75° C./15 torr, lit. 71.5° C./15 torr) were collected: pale yellow oil.

3-Ethylthiopropyl chloride (7.00 g, 50 mmol) was dropped slowly into Mg turnings (1.22 g, 50 mmol) activated with 2 drops of Br$_2$ in Et$_2$O (70 mL). After 12 h of reflux the Grignard reagent was added to Me$_2$SiCl$_2$ (25.8 g, 200 mmol) in diethyl ether (100 mL). After refluxing for 18 h under mechanical stirring the Mg salts were filtered off, washed with Et$_2$O (2×25 mL), and the solvent was evaporated from the combined filtrates. The residue was fractionally distilled: 45° C./0.01 torr, 4.20 g, 42%.

Bis(3-ethylthiopropyl)methylsilyl chloride (26)

Mg turnings (10.4 g, 0.433 mol) were placed in a 3-neck 500 mL round bottom flask fitted with a pressure equalizing dropping funnel, reflux condenser and nitrogen inlet. 3-Ethylthiopropyl chloride (31, 41.5 g, 0.3 mol) and THF (250 mL) were charged to the dropping funnel, and several drops of the solution were added to the main flask. The reaction was initiated with a few crystals of iodine and gentle heating. The chloride solution was added slowly over 2 hours resulting in a grey solution of the Grignard reagent. Trichloromethylsilane (22.4 g, 0.15 mol) was then added to the Grignard reagent, and the mixture was heated under reflux for 16 h. Mg salts were filtered off and washed with THF (3×100 mL). The organic fractions were combined and the solvent was removed under reduced pressure to give a light brown oil. The product was fractionally distilled at reduced pressure: 65° C./0.1 torr, 18.8 g, 44%.

1,3,5-Tris[12-(3-ethylthiopropyl)dimethylsilyl-1,12-dicarba-closo-dodecaboran-1-yl]benzene (27)

A solution of 1,3,5-tris(1',12'-dicarba-closo-dodecaboran-1'-yl)-benzene (24, 100 mg, 0.2 mmol) in ether (40 mL) was cooled to –40° C. t-Butyl lithium (1.7M in pentanes, 0.2 mL) was added over 5 min, and the solution was stirred for 1.5 h while the temperature rose to about –5° C. It was cooled again to –25° C. and 25 (67 mg, 0.34 mmol) was added. The solution was stirred at –25° C. for 15 min and then heated under reflux for 20 h. The sequence of cooling, adding t-butyl lithium and 25, and refluxing was repeated a total of four times. The reaction mixture was then poured into sulfuric acid (50 mL, 5M). The organic layer was separated and the acid layer was extracted twice with ether (2×25 mL). The combined ether fractions were washed with potassium carbonate solution (10%, 2×50 mL) and dried over sodium sulfate. The solvent was removed, giving a clear oil, which was chromatographed on silica gel (60–200 mesh, 30×1.2 cm) with benzene/hexane (20:80). The product 27 was separated from a siloxane impurity by preparative TLC. Methanol removed the siloxane and left 27 at the start, and extraction with dichloromethane gave 54 mg (28%) of a white crystalline solid of approximately 98% purity. Analytically pure material was obtained by column chromatography on silica gel (60–200 mesh, hexane/dichloromethane 1:1); Mp. 92° C.

1,3,5-Tris[12-bis(3-ethylthiopropyl)methylsilyl-1,12-dicarba-closo-dodecaboran-1-yl]benzene (28)

A solution of 1,3,5-tris(1',12'-dicarba-closo-dodecaboran-1'-yl)benzene (24, 425 mg, 0.85 mmol) in ether (100 mL) was cooled to –40° C. t-Butyl lithium (1.7M in pentanes, 0.7 mL) was added over 5 min, and the solution was stirred for 1.5 h, while it warmed to about –5° C. It was cooled again to –25° C., 26 (340 mg, 1.2 mmol) was added, the stirring was continued at –25° C. for 15 min, and the solution was then heated under reflux for 20 h. The sequence of cooling, adding t-butyl lithium and 26, and heating under reflux was repeated a total of six times. The reaction mixture was then poured into 5M sulfuric acid (70 mL). The acidic layer was extracted twice with ether (2×50 mL), added to the organic layer, the combined ether fractions were washed with potassium carbonate solution (10%, 2×50 mL), and dried over sodium sulfate. The solvent was removed to give a clear oil, which was chromatographed (silica gel 60–200 mesh, 40×2.5 cm column) with benzene/hexane (1:4, then 1:2, and finally 1:1). The desired product eluted together with a siloxane impurity, from which it was separated by preparative TLC. Methanol left 28 at the start, and removed the siloxane. Subsequent elution with dichloromethane gave 262 mg (25%) of a clear viscous oil of about 98% purity. Analytically pure material was obtained by column chromatography on silica gel (60–200 mesh) with hexane/dichloromethane (1:1).

Desilylation of 1,3,5-Tris[12-(3-ethylthiopropyl) dimethylsilyl-1,12-dicarba-closo-dodeca-boran-1-yl] benzene (27) with Fluoride Anion A solution of 27 (1.8 mg, 0.0018 mmol) and tetra-n-butylammonium fluoride (21 mg, 0.065 mmol, 12 equivalents) in THF (1 mL) was stirred at room temperature for 62 h. THF was evaporated, the residue was extracted with toluene (5 mL), the solvent was evaporated, and the residue dissolved in $CDCl_3$. $^1$H NMR spectrum showed only the signals of 1,3,5-tris(1',12'-dicarba-closo-dodecaboran-1'-yl)benzene (24) and no signals of 27.

Desilylation of 1,3,5-Tris[12-bis(3-ethylthiopropyl) methylsilyl-1,12-dicarba-closo-dodecaboran-1-yl]benzene (28) with Fluoride Anion.

The above procedure was applied to 28 (2.1 mg, 0.0017 mmol), using tetra-n-butyl-ammonium fluoride (25 mg, 0.078 mmol, 8 equivalents) in THF (1 mL). At the end, the $^1$H NMR spectrum again showed only the presence of 24 and no. 28.

The following exemplify Hg couplings of carboranyl groups as illustrated in Scheme 7.

Two-Step Procedure

To a solution of (p-carboranyl)benzene 33 (120 mg, 0.54 mmol) in THF (15 mL) was added LDA, lithium diisopropylamide (2M, 0.4 mL, 0.8 mmol) at −78° C. After stirring for 1 h, $HgCl_2$ (70 mg, 0.26 mmol) was added and the reaction mixture slowly warmed to rt. After stirring for 4 h, the yellow solution was poured into aqueous $NH_4Cl$ and extracted with diethyl ether (3×10 mL). The combined organic phases were washed with $H_2O$ (10 mL) and dried with $MgSO_4$. After removal of the solvent under reduced pressure, the beige residue (160 mg) was dissolved in $CH_2Cl_2$ and purified by chromatography (silica, $CHCl_3$) to give 34, bis(12-phenyl-1,12-dicarba-closo-dodecacarboran-1-yl)mercury, as a white solid (120 mg, 72%), Mp. 239°–240° C.

One-Step Procedure A

To a solution of $HgBr_2$ (8.2 mg, 0.023 mmol), NaBr (4.3 mg, 0.042 mmol) and (p-carboranyl)benzene (33, 5.0 mg, 0.023 mmol) in DMF (2.5 mL, freshly distilled) was added t-BuOK (10.0 mg, 0.089 mmol) at −10° C. under $N_2$. The reaction mixture was stirred at rt for 3 h. The mixture was then poured into water and extracted with diethyl ether (3×10 mL). The combined organis phases were washed with brine and dried over $MgSO_4$. The product yield was 97% based on GC. After removal of the solvent, the product 34 was purified by thick layer chromatography and subsequent sublimiation (200° C., $10^{-4}$ torr) and isolated in 79% yield.

One-Step Procedure B

A solution of mercury triflate was prepared according to Peringer, P. 1980 *Inorg. Nucl. Chem.*, 42, 1502, from HgO (24 mg) and triflic acid (0.19 mL) in propylene carbonate (1.5 mL) instead of DMSO. The reaction was complete within 30 s and produced a clear colorless solution. After cooling the solution to rt, 33 (85 mg, 0.222 mmol) was added. After 1 min $^1$H NMR indicated 100% conversion to 34. The reaction mixture was poured into water (25 mL) and extracted with diethyl ether (3×20 mL), but complete removal of solvent by distillation under reduced pressure, repeated thick layer chromatography (silica, hexanes) yielded a white solid (21 mg, 29%) identical with 34 by $^1$H NMR and tlc (thin layer chromatography, silica/hexanes), except for residual solvent contamination.

Example 3

Synthesis of a Metal Porphyrin Sandwich Monomer

Synthesis of La(tetrapyridylporphyrin)$_2$

The synthesis employed a similar procedure to that described by Buchler et al. (1986) supra.

A 250 mL three-necked flask was fitted with a condenser and an argon inlet. A suspension of 306 mg (0.5 mmol) of tetrapyridylporphyrin in 50 mL of trichlorobenzene was stirred under argon for about 15 min. n-BuLi (1.6M in hexane) (2 mL, 3.2 mmol) was added by a syringe and the mixture was stirred at room temperature for another hour. Tris(acetylacetonate) lanthanum (650 mg, 1.5 mmol) was then added under a strong flow of argon, and the mixture was refluxed for about 12 hrs. After the reaction mixture was cooled, 200 mL of petroleum ether was added and a brown powder was filtered off. Lanthanum by-products were removed using a first silica gel column eluting with 50%/50% (by volume) MeOH/$CHCl_3$. Excess tetrapyridylporphyrin was removed using a second silica gel column eluting with 10% MeOH/$CHCl_3$. The desired product was eluted with 40% MeOH/$CHCl_3$. Solvent removal afforded 0.1155 mg of the desired product as a purple solid (which appeared green in methanol solutions). The product can be purified by preparative HPLC eluting with 75% MeOH/25% $H_2O$ (by volume).

Synthesis of La(tetrapyridylporphyrin)$_2^-$(nBu$_4$N)$^+$

A 250 mL three-necked flask was fitted with a condenser and an argon inlet. A suspension of 0.619 g (1 mmol) of tetrapyridylporphyrin in 50 mL of trichlorobenzene was stirred under argon for about 15 min. n-BuLi (1.6 m in hexane) (2 mL, 3.2 mmol) was then added by syringe and the mixture was refluxed for about 2 hrs. After the reaction mixture was cooled down, 200 mL of petroleum ether was added and the resulting powder was filtered off. Extraction by methanol gives a green solution which after evaporation of the solvent leaves a gray-purple powder (0.568 g, 70%). The isolated material can be cleared on a silica gel column using 25% MeOH/75% $CHCl_3$.

Those of ordinary skill in the art will appreciate that procedures, techniques, methods, reagents and starting materials other than those specifically detailed herein can be readily employed in the practice of this invention without departing from its spirit and scope. For example, synthetic methods herein related to monomers containing 1,12-dicarba-closo-dodecaboran-1-yl groups can be readily adapted to synthesize monomers having other carborane arms, in particular, for monomers having 1,10-dicarba-closo-decaboran-1-yl groups. Methods of synthesis of cobalt complexes can be readily adapted employing known expedients to synthesize analogous complexes of other metals.

SCHEME 1
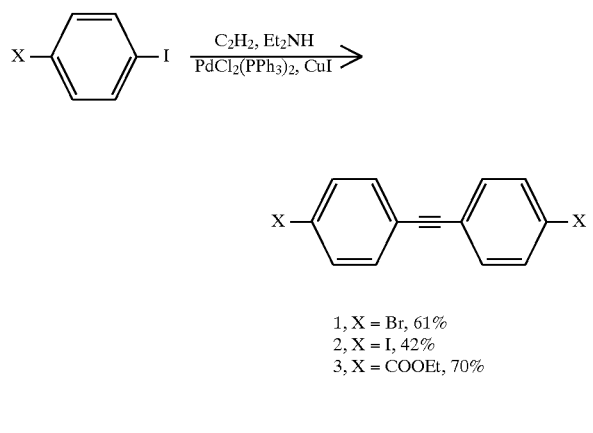
1, X = Br, 61%
2, X = I, 42%
3, X = COOEt, 70%
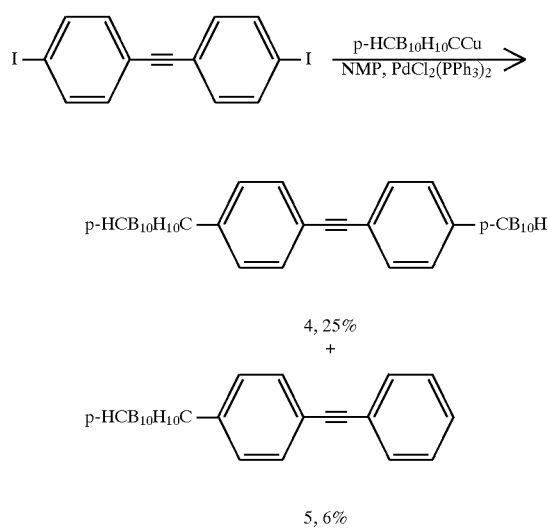
4, 25%
+
5, 6%
SCHEME 2
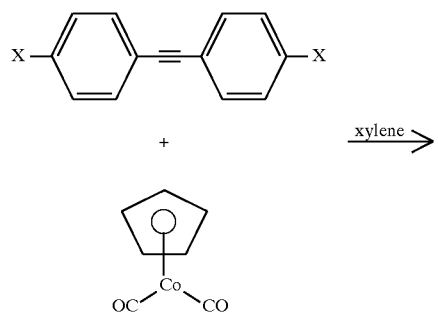
-continued
SCHEME 2
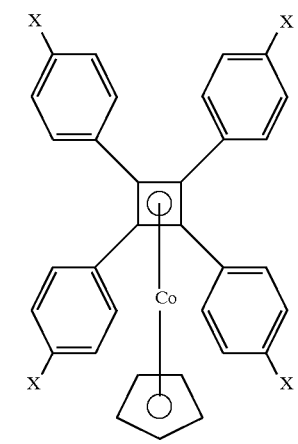
6, X = H, 40–60%
7, X = Br, 46%
8, X = I, 8%
9, X = COOEt, 72%
10, X = p-CB$_{10}$H$_{10}$CH, 54%
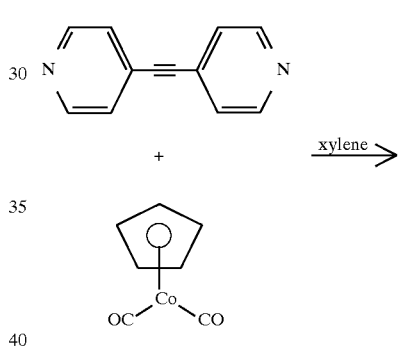
6a, 15%

37
-continued
SCHEME 2
38
-continued
SCHEME 3
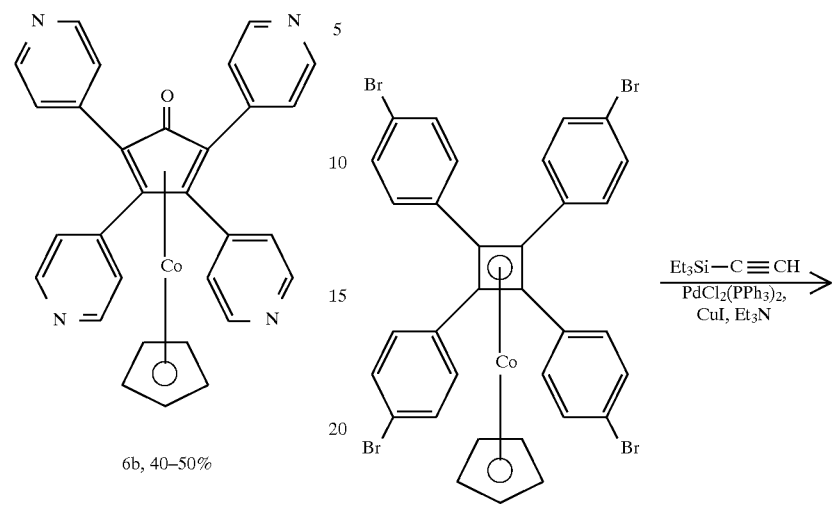
SCHEME 3
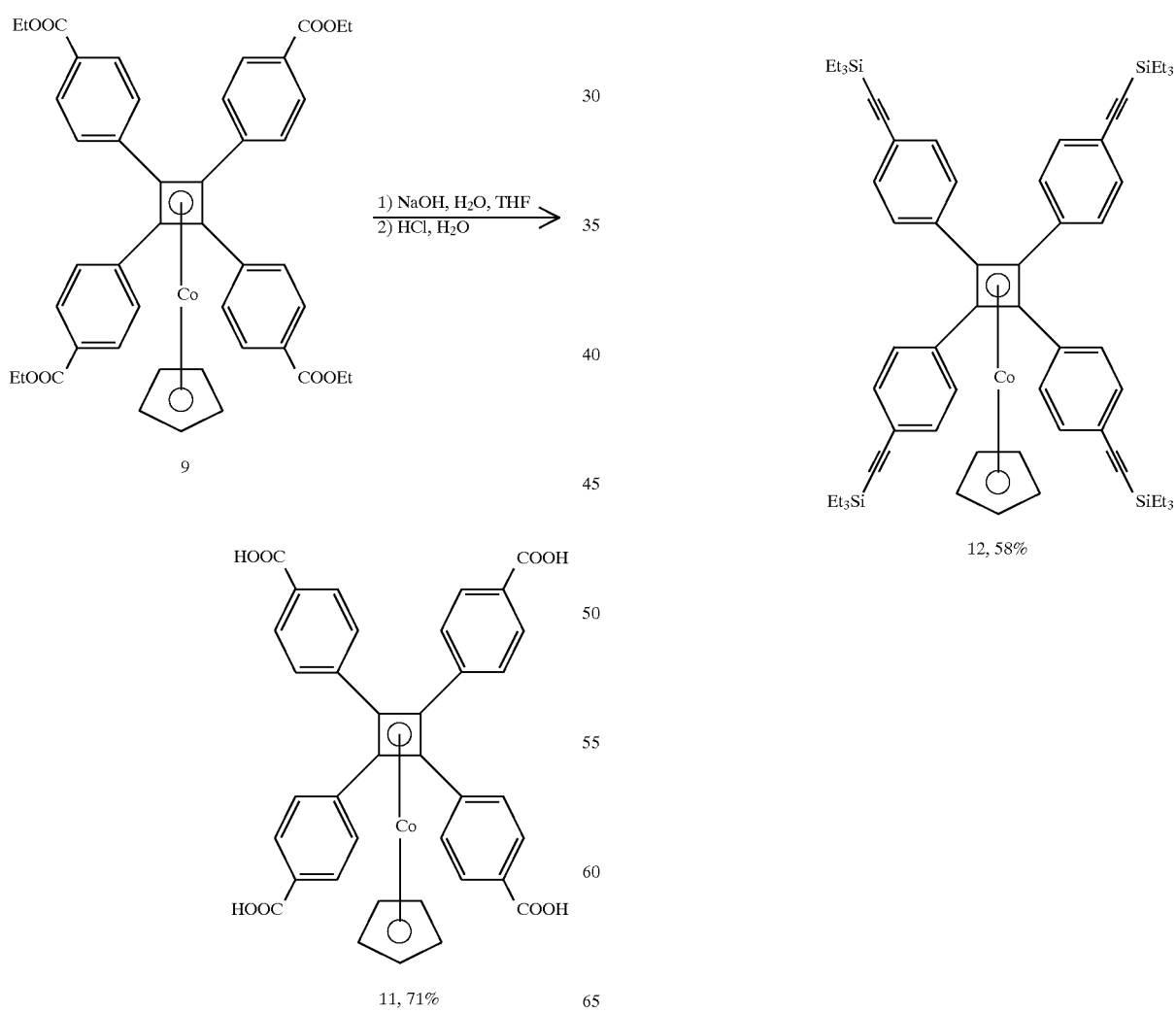

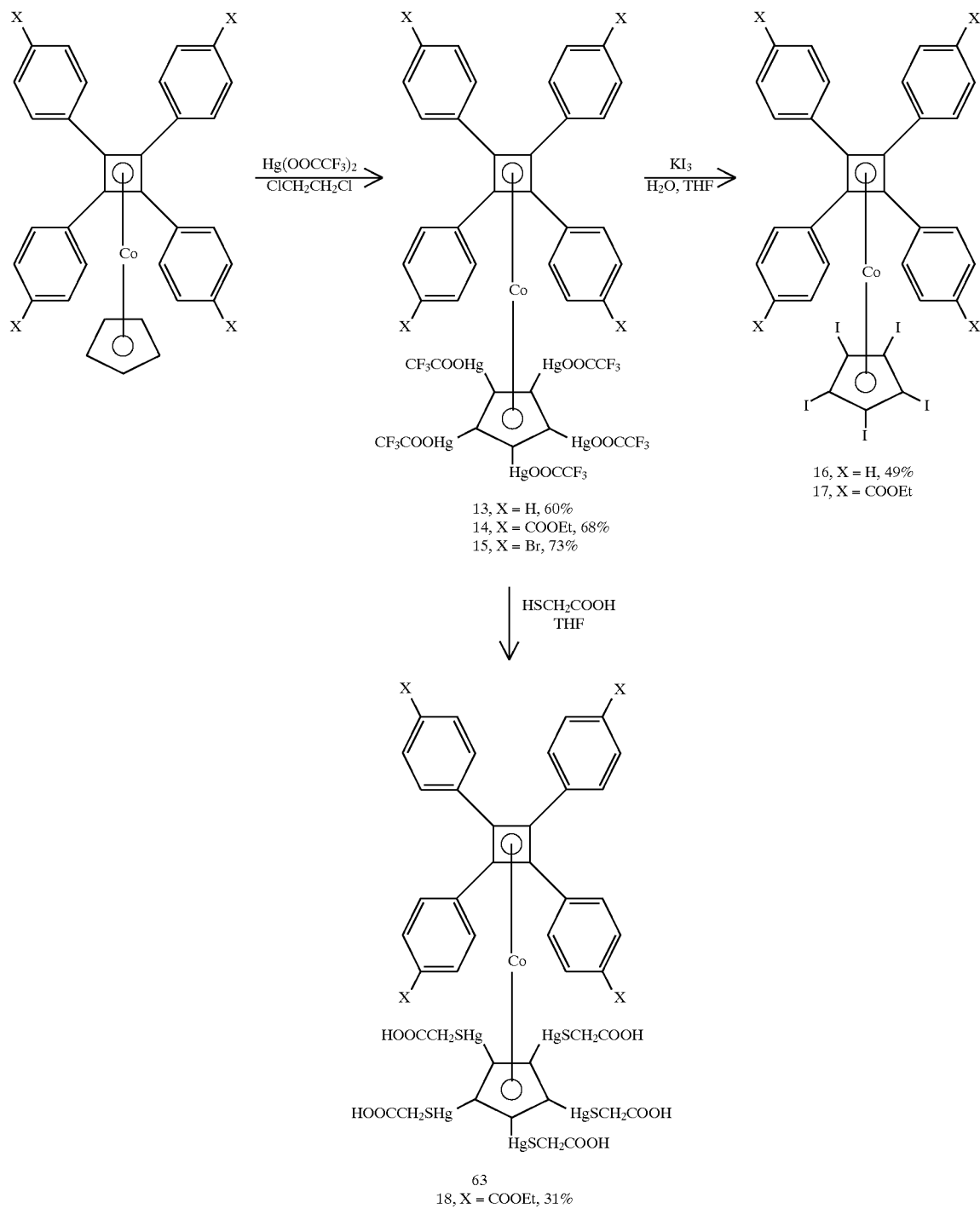

SCHEME 5
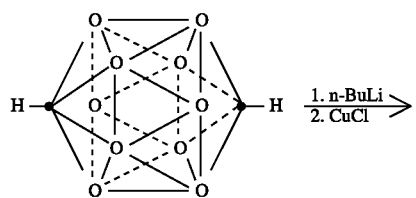
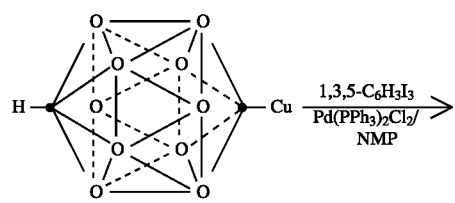
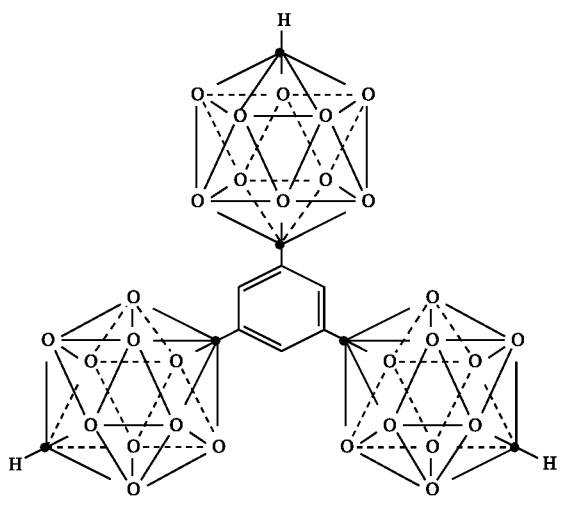
24
-continued
SCHEME 5
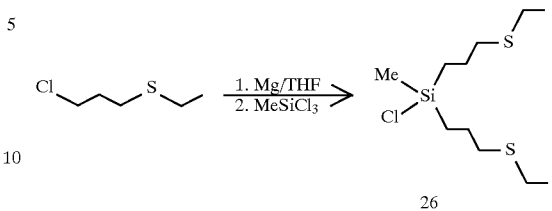
26
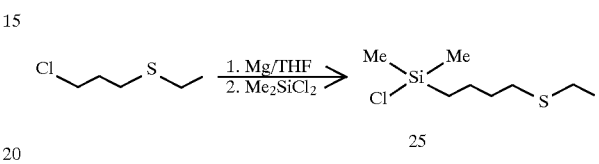
25
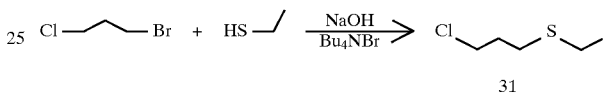
31

SCHEME 6
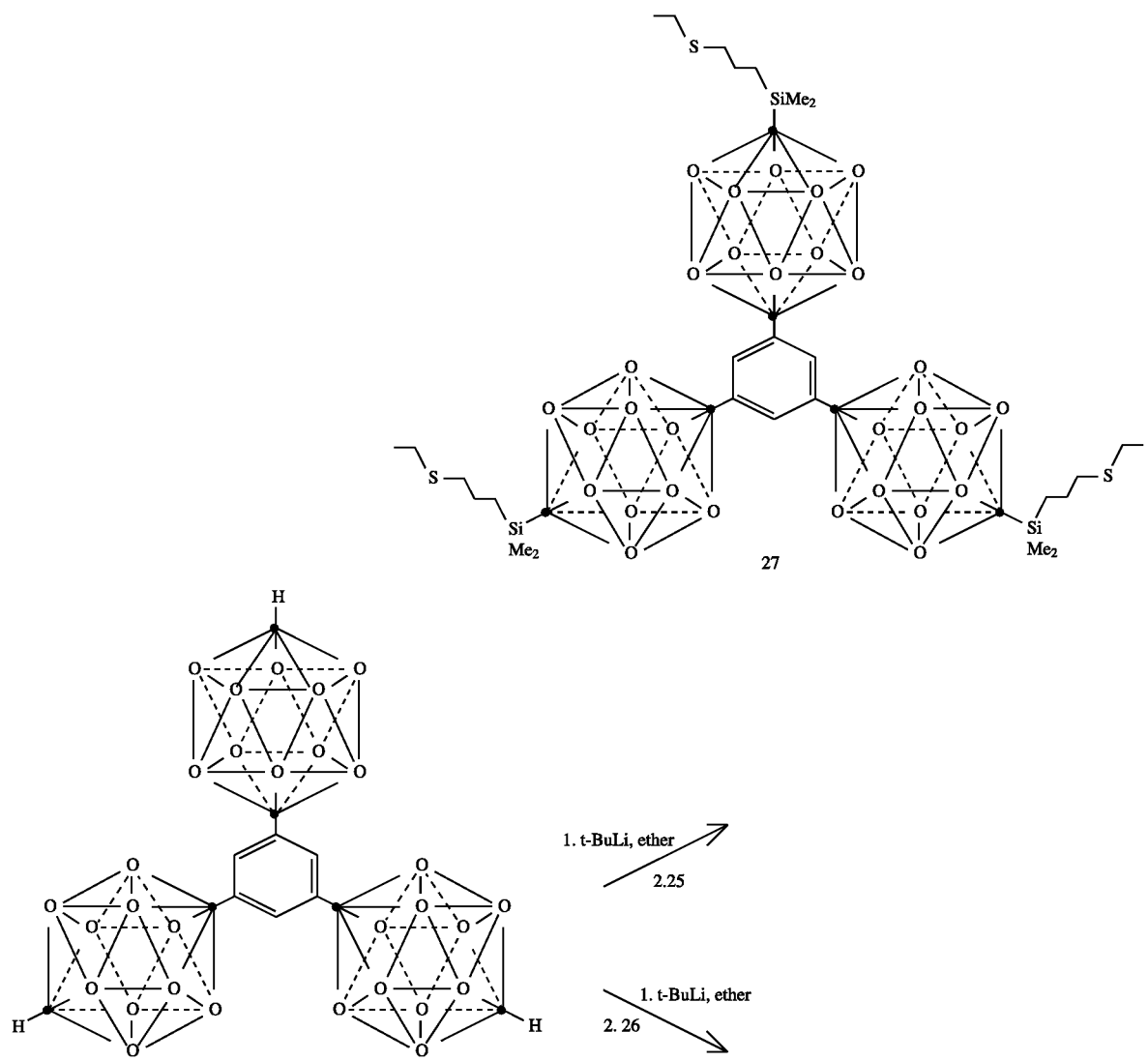

-continued
SCHEME 6

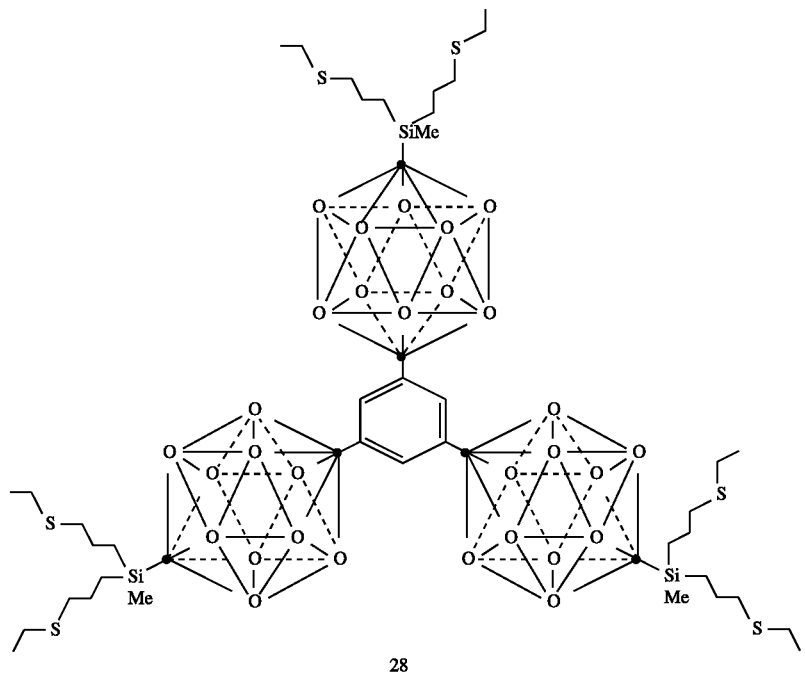

28

30

SCHEME 7

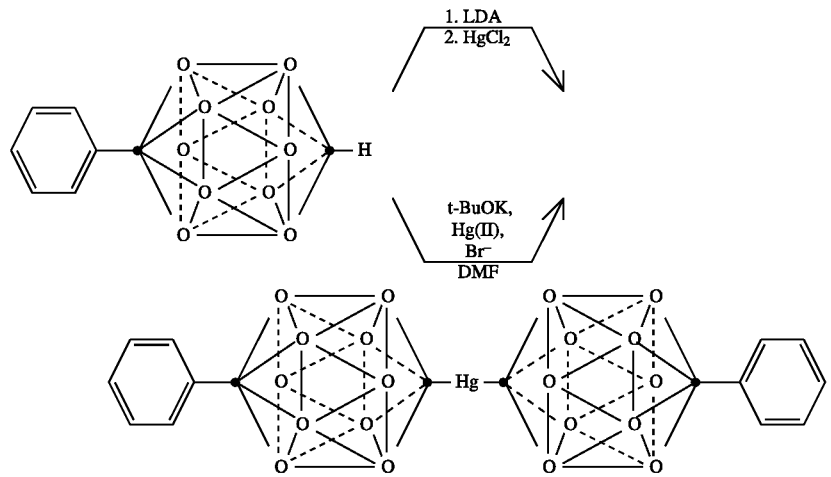

34

We claim:

1. A method of constructing molecular-sized structures by initial formation of a molecular grid structure on an interface which comprises the steps of:
   a. providing a plurality of monomers functionalized with groups that adhere to an interface, but which when bound to said interface are substantially free to rotate and substantially free to translate on said interface and which are functionalized with linker arm groups;
   b. introducing and adhering said monomers to said interface;
   c. coupling the linker arm groups of adjacent adhered monomers with each other such that a two-dimensional regular grid polymer is formed.

2. The method of claim 1 further comprising releasing said grid from said interface.

3. The method of claim 1 wherein said monomers comprise first and second connector groups, said first connector group functionalized with a plurality of linker arm groups, said second connector group functionalized with groups that adhere to said interface, said adhering groups optionally linked to said second connector group through linker arm groups and wherein said first and second connector groups are chemically linked to each other such that when said monomer is bound to said interface via the adhering groups of said second connector, said first connector is distal to said interface and the linker arms of said first connector are oriented around said connector group above said interface.

4. The method of claim 3 wherein said adhering groups are linked to said second connector through linking arms and wherein said method further comprises the steps of:

d. releasing said grid from said interface by cleaving said adhering groups from said linking arms such that the linking arms remain attached to said second connector;

e. coupling the linker arm groups of said second connector of said monomers with linker arms of adjacent monomers such that a two-dimensional regular grid of connected monomers is formed thereby fabricating a three-dimensional two-ply grid polymer structure.

5. The method of claim 1 wherein a sufficient quantity of said monomers is introduced and adhered to said interface such that a substantially ordered array of monomers is formed on said interface.

6. The method of claim 1 wherein the coupling of linker arm groups of adjacent monomers is reversible.

7. The method of claim 1 wherein said interface is a liquid mercury surface.

8. The method of claim 1 wherein said interface is the interface between two immiscible liquids.

9. The method of claim 1 wherein said coupling step includes a step of annealing.

10. The method of claim 1 wherein said monomers comprise a first connector with linker groups and a second connector functionalized with tentacle groups that adhere to said interface.

11. The method of claim 10 wherein in said monomer said first and second connectors are linked together with a pillar group such that when the monomer is adhered to the interface said linker groups are confined to a thin segment of space above the interface, and separated from it by about the height of the pillar, by adherence of said tentacles to said interface.

12. The method of claim 10 wherein the first connector of said monomer has 3, 4 or 6 linker groups.

13. The method of claim 10 wherein said second connector has from 3–6 tentacles.

14. The method of claim 1 wherein said linker groups are coupled with metal ions or metal ion complexes.

15. The method of claim 1 wherein the interface provides a substantially molecularly flat surface.

16. The method of claim 1 wherein said interface is a metal surface.

* * * * *

UNITED STATES PATENT AND TRADEMARK OFFICE
CERTIFICATE OF CORRECTION

PATENT NO. : 5,876,830

DATED : Mar. 2, 1999

INVENTOR(S) : Michl et al.

It is certified that error appears in the above-identified patent and that said Letters Patent is hereby corrected as shown below:

At column 1, line 51, please replace "Tnt." with --Int.--.
At column 2, line 5, please replace "Sepptember" with --September--.
At column 3, line 59, please replace "next" with --net--.
At column 4, line 61, please replace "my the" with --by the--.
At column 7, line 37, please replace "linker" with --linked--.
At column 8, line 60, please replace "site" with --sites--.
At column 13, line 32, please replace "desirably" with --desirable--.
At column 19, please insert --OR-- between structure IIIH and IIIJ.

// UNITED STATES PATENT AND TRADEMARK OFFICE
CERTIFICATE OF CORRECTION

PATENT NO. : 5,876,830

DATED : Mar. 2, 1999

INVENTOR(S) : Michl et al.

It is certified that error appears in the above-identified patent and that said Letters Patent is hereby corrected as shown below:

At column 22, please replace

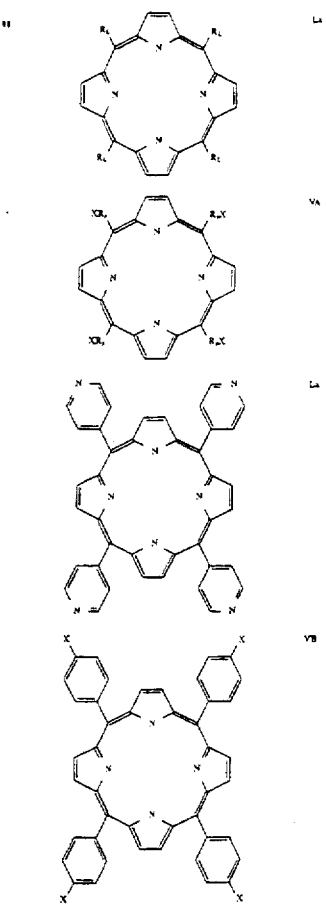

UNITED STATES PATENT AND TRADEMARK OFFICE
CERTIFICATE OF CORRECTION

PATENT NO. : 5,876,830                                    Page 3 of 6

DATED    : Mar. 2, 1999

INVENTOR(S) : Michl et al.

It is certified that error appears in the above-identified patent and that said Letters Patent is hereby corrected as shown below:

with

--

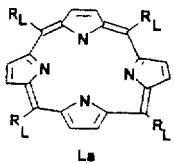
La

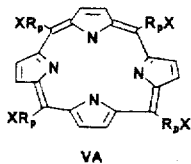
VA

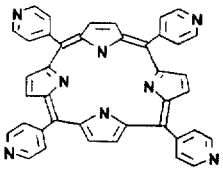
La

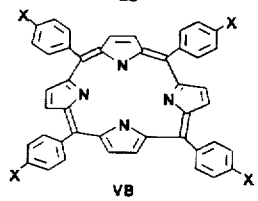
VB

--

UNITED STATES PATENT AND TRADEMARK OFFICE
CERTIFICATE OF CORRECTION

PATENT NO. : 5,876,830

DATED : Mar. 2, 1999

INVENTOR(S) : Michl et al.

It is certified that error appears in the above-identified patent and that said Letters Patent is hereby corrected as shown below:

At column 23 and 24, please replace

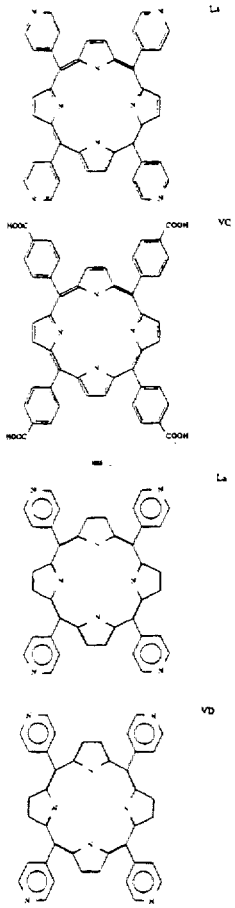

UNITED STATES PATENT AND TRADEMARK OFFICE
CERTIFICATE OF CORRECTION

PATENT NO. : 5,876,830

DATED : Mar. 2, 1999

INVENTOR(S) : Michl, et al.

It is certified that error appears in the above-identified patent and that said Letters Patent is hereby corrected as shown below:

with

--

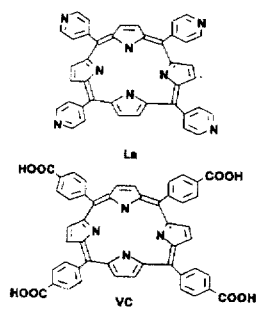

La and

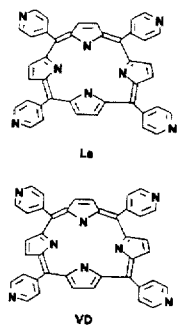

Lа

VD

--

UNITED STATES PATENT AND TRADEMARK OFFICE
CERTIFICATE OF CORRECTION

PATENT NO. : 5,876,830

DATED : Mar. 2, 1999

INVENTOR(S) : Michl, et al.

It is certified that error appears in the above-identified patent and that said Letters Patent is hereby corrected as shown below:

At column 25, line 25, please replace "diffusion-controlled)" with --(diffusion-controlled)--.
At column 25, line 54, please replace "bend" with --bond--.
At column 26, line 52, please replace "239° - 239°" with --238° - 239°--.
At column 28, line 46, please replace "Mg" with --mg--.
At column 29, line 51, please replace "trifuloroacetate" with --trifluoroacetate--.
At column 34, line 46, please replace "(1.6 m" with --(1.6 M--.
At columns 39 and 40, last structure on the page, please delete "63" below the structure.
At column 41, Scheme 5, first structure, please insert --22-- below the structure.
At columns 45 and 46, Scheme 6, please delete "30" below the structure.
At columns 45 and 46, Scheme 7, please insert --33-- below the first structure.

Signed and Sealed this

Twenty-third Day of November, 1999

Q. TODD DICKINSON

*Attesting Officer*   Acting Commissioner of Patents and Trademarks